(12) United States Patent
Essien et al.

(10) Patent No.: US 12,458,996 B2
(45) Date of Patent: Nov. 4, 2025

(54) HIGH-DEFINITION AEROSOL PRINTING USING AN OPTIMIZED AEROSOL DISTRIBUTION AND AERODYNAMIC LENS SYSTEM

(71) Applicant: Integrated Deposition Solutions, Inc., Albuquerque, NM (US)

(72) Inventors: Marcelino Essien, Albuquerque, NM (US); David M. Keicher, Albuquerque, NM (US)

(73) Assignee: Integrated Deposition Solutions, Inc., Albuquerque, NM (US)

( * ) Notice: Subject to any disclaimer, the term of this patent is extended or adjusted under 35 U.S.C. 154(b) by 26 days.

(21) Appl. No.: 17/480,370

(22) Filed: Sep. 21, 2021

(65) Prior Publication Data
US 2022/0088925 A1     Mar. 24, 2022

Related U.S. Application Data

(60) Provisional application No. 63/080,967, filed on Sep. 21, 2020.

(51) Int. Cl.
    B05B 17/06        (2006.01)
    B05B 7/04         (2006.01)
             (Continued)

(52) U.S. Cl.
    CPC ........ B05B 17/0615 (2013.01); B05B 7/0416 (2013.01); B41J 2/03 (2013.01);
             (Continued)

(58) Field of Classification Search
    CPC .................... B05B 17/0615; B05B 7/0416
    See application file for complete search history.

(56) References Cited

U.S. PATENT DOCUMENTS 6,348,687 B1 *   2/2002   Brockmann ......... B23K 26/144
                                               250/288
10,124,602 B2    11/2018   Essien
                       (Continued)

FOREIGN PATENT DOCUMENTS

KR          102139919 B1     8/2020

OTHER PUBLICATIONS

Int'l Search Report for PCT/US2021/051228, dated Dec. 29, 2021.
EESR issued in corresponding European Appln. No. 21870403.9, dated Sep. 25, 2024.

*Primary Examiner* — Dah-Wei D. Yuan
*Assistant Examiner* — Stephen A Kitt
(74) *Attorney, Agent, or Firm* — MaxGoLaw PLLC

(57) ABSTRACT

An apparatus for printing discrete high-resolution high-density features on a surface is provided using an aerosol stream. An aerosol chamber has a transport gas that enters through a port and entrains aerosol in an aerosol chamber to form an aerosol-laden transport gas. A flow cell is provided that has a flow cell channel and sheath gas conduits. The aerosol-laden transport gas passes through the flow cell channel and is surrounded by sheath gas passed through the sheath gas conduits. At least one aerodynamic lens receives the aerosol-laden transport gas surrounded by sheath gas. A method of printing the aerosol droplets from the aerosol-laden transport gas onto the substrate with a mean diameter of 0.5 to 8 microns is also provided.

11 Claims, 24 Drawing Sheets

(51) Int. Cl.
*B41J 2/02* (2006.01)
*B41J 2/03* (2006.01)
*B41J 2/175* (2006.01)

(52) U.S. Cl.
CPC ...... *B41J 2/17596* (2013.01); *B41J 2002/022* (2013.01); *B41J 2202/02* (2013.01)

(56) References Cited

U.S. PATENT DOCUMENTS

| | | |
|---|---|---|
| 10,391,706 B2 | 8/2019 | Johnson et al. |
| 2006/0175431 A1* | 8/2006 | Renn ...................... A62C 31/00 239/296 |
| 2009/0061089 A1* | 3/2009 | King .......................... B41J 2/04 427/255.25 |
| 2013/0029032 A1* | 1/2013 | King .......................... B41J 2/04 427/256 |
| 2014/0342082 A1 | 11/2014 | Renn et al. |
| 2018/0015730 A1* | 1/2018 | Essien .................. B41J 2/17596 |
| 2020/0122461 A1 | 4/2020 | Christenson et al. |

* cited by examiner

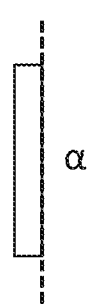 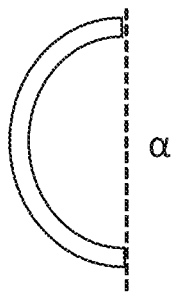 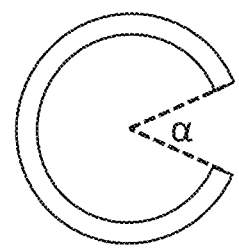
FIG. 5A   FIG. 5B   FIG. 5C
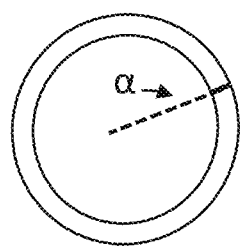 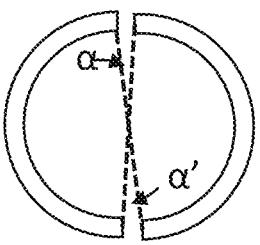 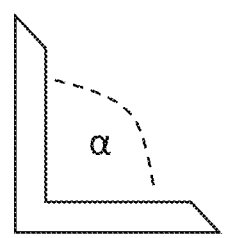
FIG. 5D   FIG. 5E   FIG. 5F
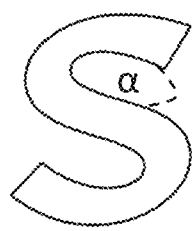 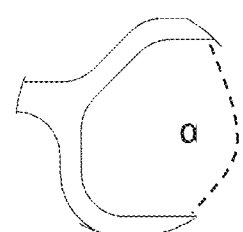 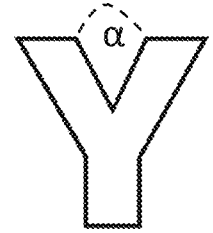
FIG. 5G   FIG. 5H   FIG. 5I (Section A-A')

(Section B-B')

(Section C-C')

(Section D-D')

(Section E-E')

(Section F-F')

HIGH-DEFINITION AEROSOL PRINTING USING AN OPTIMIZED AEROSOL DISTRIBUTION AND AERODYNAMIC LENS SYSTEM

CROSS-REFERENCE TO RELATED APPLICATION

This application claims priority of U.S. Provisional Patent Application Ser. No. 63/080,967, filed Sep. 21, 2020, which is incorporated herein by reference.

FIELD OF THE INVENTION

The present invention in general relates to aerosol printing, and in particular to devices that use aerosol-based printing to deposit high-density, high-resolution traces on a surface.

BACKGROUND OF THE INVENTION

Direct Write printing, defined as maskless printing of discreet patterns on a substrate in a one-step process offers many advantages to conventional printing technologies such as lithography and chemical and physical vapor deposition. Indeed, Direct Write processes such as aerosol-based printing are far less expensive to establish and maintain and offer greater flexibility than conventional techniques.

Typically, in aerosol-based printing aerodynamic lenses are used. The use of aerodynamic lenses to focus an aerosol stream is well known as described by Peng Liu, Paul J. Ziemann, David B. Kittelson, and Peter H. McMurry, Generating Particle Beams of Controlled Dimensions and Divergence: I. Theory of Particle Motion in Aerodynamic Lenses and Nozzle Expansions, *Aerosol Science and Technology*, 22:3, 293-313 (1995). An aerodynamic lens is defined as a flow configuration in which a stream traveling through a cylindrical channel with diameter D is passed through an orifice with diameter d, undergoing one contraction upstream of the orifice and one subsequent and immediate expansion downstream of the orifice. A contraction of an aerosol stream is produced as the flow approaches and passes through the orifice. The gas then undergoes an expansion as the flow propagates downstream into a wider cross-sectional area. Flow through the orifice forces particles towards the flow axis, so that the aerosol stream is narrowed and collimated to provide the functional attributes of a lens. Aerosol streams collimated by an aerodynamic lens system have been designed for use in many fields, including pharmaceutical aerosol delivery and additive manufacturing. In the typical aerodynamic lens system, an aerosol stream is tightly confined around the axis of a flow cell by passing the particle distribution through a series of axisymmetric contractions and expansions. Each section of the lens system consisting of a flow channel and an orifice is defined as a stage. Liu has presented a method and apparatus for focusing sub-micron particles using an aerodynamic lens system. Di Fonzo et. al. and Dong et al. have designed lens systems that focused particles with diameters in the range from 10 to 100 nanometers and 10 to 200 nanometers, respectively. Di Fonzo, F., Gidwani, A., Fan, M. H., Neumann, D., Iordanoglou, D. I., Heberlein, J. V. R., McMurry, P. H., Girshick, S. L., Tymiak, N., Gerberich, W. W., and Rao, N. P., "Focused nanoparticle-beam deposition of patterned microstructures," Appl. Phys. Lett. 77(6), 910 (2000). Dong, Y., Bapat, A., S. Hilchie, U. Kortshagen and S. Campbell, "Generation of nano-sized free standing single crystal silicon particles", Journal of Vacuum Science & Technology B: Microelectronics and Nanometer Structures Processing, Measurement, and Phenomena 22, 1923 (2004).

Wang has designed a lens system to focus particles in the range of 3 to 30 nanometers. Lee has reported a method of focusing micron-sized particles at atmospheric pressures using a single lens system composed of multiple stages. Lee, J-W, et. al. "Inertial focusing of particles with an aerodynamic lens in the atmospheric pressure range", Aerosol Science 34 (2003) 211-224.

In U.S. Pat. No. 6,348,687, Brockmann discloses an apparatus for generating a collimated aerosol beam of particles with diameters from 1 to 100 microns. The aerodynamic lens system of Brockmann uses a series of fixed lenses and an annular sheath gas surrounding a particle-laden transport gas. The system of Brockmann was used to focus 15-micron aluminum particles to a diameter of 800 microns, and generally uses the same aerosol and sheath gas flow rates. In U.S. Pat. No. 7,652,247, Lee discloses an aerodynamic lens system for focusing nanoparticles in air with diameters between 5 and 50 nanometers. In U.S. Pat. No. 8,119,977, Lee discloses a multi-stage, multi-orifice aerodynamic lens for focusing a range of particle diameters covering two orders of magnitude, from 30 to 3000 nanometers. In U.S. Pat. No. 6,924,004, Rao discloses a method and apparatus for depositing films and coatings from a nanoparticle stream focused using an aerodynamic lens system. The apparatus of Rao uses high-speed impaction to deposit nanoparticles on a substrate. A method of separating particles from a gas flow using successive expansions and compressions of the flow created by an aerodynamic lens is discussed by Novosselov in U.S. Pat. No. 8,561,486.

Hydrodynamic focusing using a sheath gas is generally accomplished by propagating an annular sheath/aerosol flow through a continuously converging nozzle, using differing sheath and aerosol gas flow rates. The degree of focusing is proportional to the ratio of the gas flows. In U.S. Pat. No. 7,108,894, Renn discloses a method of particle focusing using a coaxial sheath gas flow that surrounds an aerosol-laden transport gas. The combined flow is then propagated through a converging nozzle. Renn teaches that for the operational range of a flow system using a sheathed aerosol stream and a single converging nozzle, the diameter of the focused beam is a strong function of the ratio of the sheath to aerosol gas flow rates.

Focusing of a stream of aerosol particles using a system of aerodynamic lenses was first reported by Liu as cited above. The system of Liu was used to narrow and collimate a beam of spherical particles with diameters of approximately 25 to 250 nanometers. Liu used a lens system having three to five stages, with emphasis placed on achieving a low pressure drop across each lens. Numerous experimental and theoretical studies have been performed after the work of Liu, considering the aerodynamic effects of single and multi-orifice lens configurations.

Many researchers have reported studies of aerodynamic focusing of aerosol streams using fixed multi-stage lens systems (Lee, Brockmann, and Liu). Lee discloses an aerodynamic lens for focusing nanoparticles with diameters ranging from 30 to 3000 nanometers. Brockmann describes a multi-stage lens system that focuses large, solid particles. The Brockmann apparatus also uses an annularly flowing sheath gas to prevent impaction of particles onto the orifice surfaces. The apparatus of Brockmann propagates a sheath gas flow through the entire multi-stage lens system. Liu has disclosed an apparatus for focusing nanoparticles using an aerodynamic system consisting of three stages to five stages.

Sheath gas flows are frequently used to focus fluid flows. In the case of an aerosol stream flowing through a lens or a series of lenses, the addition of a sheath gas augments the aerodynamic focusing effect of the lenses by occupying some fraction of the cross-sectional area of the lens orifice, in effect stretching the aerosol flow through the orifice so that a decrease in the aerosol beam diameter is achieved. The effect of the sheath is therefore to produce hydrodynamic focusing of the aerosol stream over a broad range of droplet diameters.

In aerosol printing applications, aerosol droplets with diameters ranging from approximately 0.5 to 5 microns are typically produced by various aerosolization methods. The most common aerosolization methods used in the art of aerosol printing are pneumatic aerosolization and ultrasonic aerosolization. Ultrasonic aerosolization produces a droplet diameter distribution that requires a series of aerodynamic lens for optimal focusing. In a common use of ultrasonic aerosolization, a 1.6 MHz transducer frequency produces droplets with a medium diameter of approximately 3 microns. Droplets with diameters as small as 0.5 and as large as 5 microns can be produced using a 1.6 MHz transducer frequency, so that a multi-lens aerodynamic focusing assembly is needed to perform high-definition printing.

In Filament Extension Atomization (FEA) an ink is flowed between two smooth counter-rotating surfaces, creating a filament that is stretched until breakup occurs. Other embodiments of FEA are also applicable to aerosol-based printing. The resulting aerosol can be nearly monodispersed and can be transported to a flow cell and focused for use in aerosol jet printing applications. The FEA process can be tuned to provide the optimum droplet size distribution for a specific aerodynamic lens assembly, or for a single aerodynamic lens.

In electrospray atomization an electric field is used to pull droplets from a fluid meniscus formed between a nozzle with a pendant emerging fluid and a charging plate. A relatively narrow droplet diameter is produced in the electrospray aerosolization technique so that tight focusing of an aerosol can be accomplished using two aerodynamic lenses. An ionization source is typically used to remove charge from the droplets prior to the focusing step.

In vibrating mesh aerosolization a liquid sample is placed above a mesh composed of small holes. A piezoelectric element forces the mesh to vibrate vertically, so that fluid is entrained and emitted from the mesh. Vibrating mesh aerosolization can produce an aerosol distribution with a relatively small diameter dispersion. Vibrating mesh nebulizers produce droplets with diameters in the range of approximately 1 to 5 microns.

The ability to focus a droplet entrained in a gas stream is related to the Stokes number, St, of the droplet. It is generally accepted that optimum focusing of an aerosol is obtained when St is equal to unity. Unfocused droplets can be generally categorized as overspray or satellite deposition. Overspray deposition occurs when small droplets pass through the lens assembly with a small Stokes number without achieving a Stokes number near unity at any stage of the assembly. Satellite droplets are conversely generated when large droplets pass through each stage of the assembly with Stokes number much greater than unity.

The droplet Stokes number is dependent on the droplet mass, droplet diameter, aerodynamic lens diameter, and gas flow rate through the lens. A single-lens focusing system cannot provide focusing of droplet diameters that vary over an order of magnitude. While the use of multi-lens focusing assemblies has been reported, droplets in the range of approximately 0.5 to 1.0 microns are difficult to focus. Small droplets, roughly defined as droplets with diameter less than 700 nm, are particularly problematic in aerosol focusing. While it is possible to vary the flow rate and lens diameter to achieve a Stokes number of unity for small droplets, in practice configurations and parameters that produce a Stokes number of one for small droplets are invariably prone to clogging, and are not suitable for reliable, production-level applications.

Previous attempts in aerosol printing to improve focusing of micron and sub-micron size droplets have used methods involving the addition of solvent vapor in transport and sheath gas flows, or methods employing multi-lens focusing assemblies. Neither method, however, can singularly provide a viable solution suitable for high-accuracy or high-volume production applications. Indeed, the aerodynamic lens diameters and gas flow rates required to focus the smallest aerosol droplets in the distribution, that is, lens diameters and flow rates that yield a Stokes number of 1, are prone to the development of non-laminar flow that produces clogging. It is therefore essential for any method of producing high-definition printing to begin with a suitable droplet diameter distribution that is maintained throughout the transport and focusing processes.

In general, optimum focusing of an aerodynamic lens is obtained for droplet and flow parameters that yield a Stokes number of 1. The Stokes number is related to the particle diameter and the orifice diameter according to equation 1;

$$St = \left(\frac{\rho d^2 C}{18\mu}\right)\frac{U}{D} \tag{1}$$

where $\rho$ is the particle density, d the particle diameter, C is the slip correction factor, $\mu$ is the gas dynamic viscosity, U is the gas velocity at the orifice, and D is the orifice diameter. The slip correction factor is calculated to be approximately 1. In the case of a sheathed flow, the gas velocity is taken to be the sum of the sheath and transport gas velocities.

Prior art attempts at aerosol-based printing have met with limited success in part owing to the frequent requirements for servicing. As a result, reliable manufacturing-scale reproduction has been hampered by limited throughput and lack of maintenance of reproducible tolerances. One source of the need for service has been solvent vapor condensation that produces fluid accumulation along the flow path and in particular at the gas input, the aerosol output, and combinations of both.

Thus, there exists a need for an aerosol-based printing apparatus that inhibits solvent vapor condensation that produces fluid accumulation in the gas and aerosol transport conduits and the need for a condensation purge cycle. There further exists a need for a method of operating an aerosol-based printing apparatus capable of providing a stable aerosol stream at a constant material deposition rate to a substrate to provide high-definition, high-resolution traces continuously for more than 24 hours without service.

SUMMARY OF THE INVENTION

An apparatus for printing discrete high-resolution high-density features on a surface is provided using an aerosol stream. An aerosol chamber has a transport gas that enters through a port and entrains aerosol in an aerosol chamber to form an aerosol-laden transport gas. A flow cell is provided that has a flow cell channel and sheath gas conduits. The aerosol-laden transport gas passes through an aerosol tube in the flow cell channel and is surrounded by sheath gas passed through the sheath gas conduits. At least one aerodynamic lens receives the aerosol-laden transport gas surrounded by sheath gas.

A method of printing discrete high-resolution high-density features on a surface using an aerosol stream is also provided. An aerosol-laden transport gas is provided having aerosol droplets with a mean diameter of 1 to 6 microns and a sheath gas surrounding the aerosol-laden transport gas. The aerosol-laden transport gas is exhausted onto the substrate or a plurality of substrates for at least 24 hours of unattended operation.

BRIEF DESCRIPTION OF THE DRAWINGS

The present invention is further detailed with respect to the following drawings that are intended to show certain aspects of the present invention but should not be construed as a limit on the practice of the present invention.

FIGS. 5A-5I are bottom views of a variety of baffles operative in the present invention;

DETAILED DESCRIPTION OF THE INVENTION

Figure 1A:
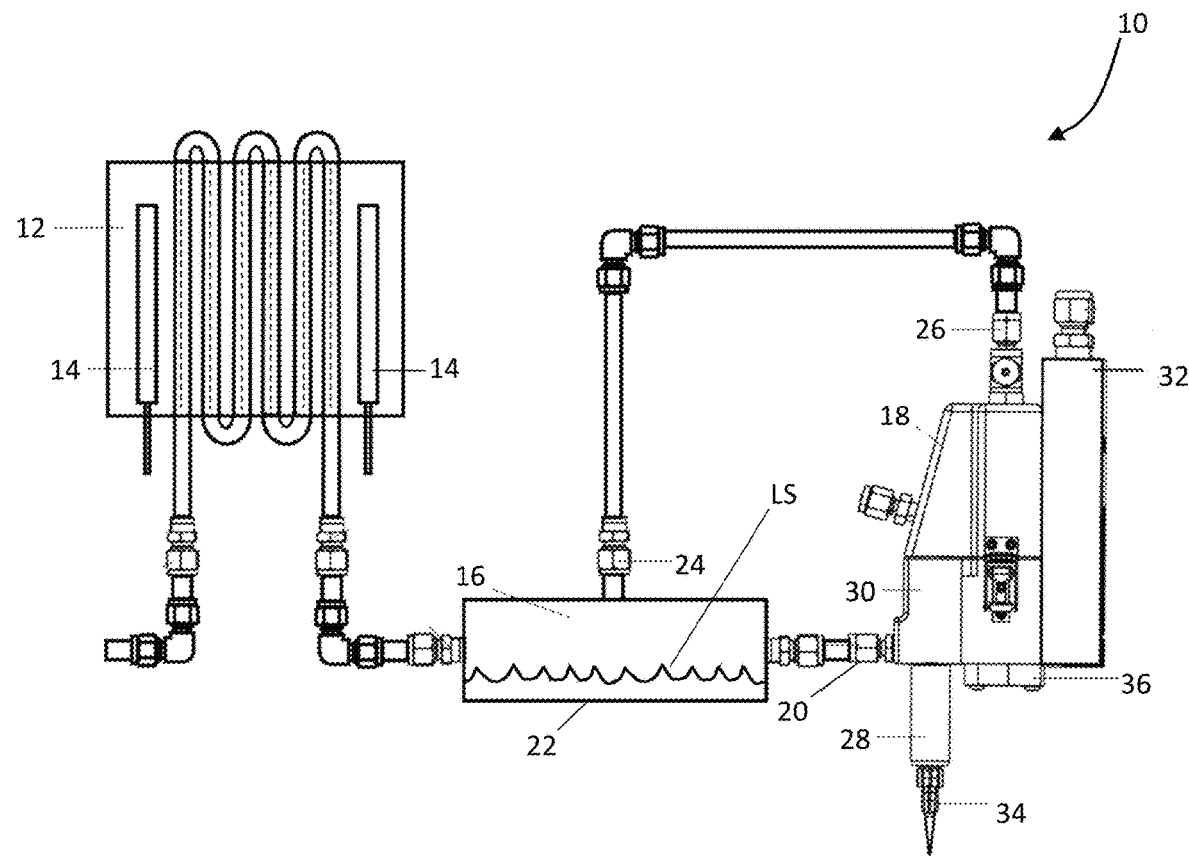
FIG. 1A is a schematic of an inventive apparatus that minimizes or eliminates overspray and satellite droplet deposition and solvent condensation, and allows for continuous unassisted printing, with operating time limited only by the rate of ink consumption and the volume of ink loaded in an ink cartridge.

The present invention has utility as an aerosol-based printing apparatus capable of providing discreet patterns using a multi-lens aerodynamic focusing assembly and a material shuttering assembly that is internal to the print head of the apparatus. Embodiments of the invention overcome the issue of solvent vapor condensation and the need for a condensation purge cycle while using the apparatus. The generation of an aerosol is the fundamental step in aerosol-based printing. Consequently, the stability, reliability, and ease of use of any aerosol printer is heavily dependent on the method used to aerosolize the printed ink. Embodiments of the present invention disclose a novel use of several aerosolization methods that produce a stable and predictable aerosol output, with a size distribution matched to an aerodynamic lens assembly. The generation and maintenance of an aerosol droplet distribution with diameters in the range of 0.5 to 8 microns and the use of an aerodynamic lens assembly matched to the distribution is disclosed. Maintenance of the droplet diameter distribution is accomplished by the addition of solvent vapor or aerosolized solvent vapor droplets to the sheath or aerosol transport gas.

The inventive apparatus minimizes or eliminates overspray and satellite droplet deposition and solvent vapor condensation, and allows for continuous unassisted printing, with operating time limited only by the rate of ink consumption and the volume of ink loaded in the ink cartridge. In embodiments of the invention, a sheath gas is passed through a reservoir containing the ink solvent fluid, allowing for solvent evaporation into the gas as the gas flows above the surface of the fluid. The temperature of the vapor laden sheath gas is kept below the dew point of the solvent as the flow passes through the print module so that condensation is eliminated.

The present invention provides production, transport, and delivery of an uninterrupted aerosol stream at a constant rate for a period of time of more than 24 continuous hours of constant operation without the need for purge or cleaning cycles as the accumulation of fluids in the form of solvent vapor condensation in the aerosol and gas transport conduits is eliminated. By inhibiting bulging and necking of the deposited trace superior line width tolerances are achieved, and embodiments of the inventive apparatus are able to maintain such tolerances for extended periods of time, thereby allowing for both the deposition of complex traces as well as consistent manufacture of duplicate articles that maintain the tolerances across a production run.

Embodiments of the invention combine the use of aerodynamic and hydrodynamic focusing as well as aerosol production methods that produce a stable, reproducible aerosol distribution matched to a lens assembly for the purpose of printing high-resolution features with trace widths of 5 microns as well as spacing as small as 5 microns. Embodiments of the inventive apparatus produce and maintain a distribution of micron-size aerosol droplets that is matched to a sheathed assembly of aerodynamic lenses. The lens assembly has the capability to focus a matched distribution to a minimum spot size of between 0.5 and 8 microns, so that high-definition structures are printed without droplet defocusing. Maintenance of the matched distribution during transport from the aerosolization source to a focusing assembly is critical to printing high-definition traces, since droplet evaporation will result in detuning of the distribution. Maintenance of the droplet diameter distribution is accomplished in embodiments of the inventive apparatus by adding solvent vapor to an aerosol transport gas or to a sheath gas. It has been determined that use of a droplet distribution with diameters greater than 0.5 micron and less than 8 microns and an aerodynamic lens assembly matched to the distribution is critical for high-definition printing. In still other embodiments, the range is greater than 1 micron and less than 6 microns.

Embodiments of invention produce highly-focused aerosol deposition by using aerosolization techniques that shift the aerosol diameter distribution so that production of droplets with diameters between 0.5 and 1.5 microns is eliminated, by the addition of solvent vapor to the gas flows to prevent evaporation and reduction of the minimum droplet size, and by the addition of a focusing assembly that focuses the larger droplets present in the shifted distribution.

Embodiments of the invention address the issue of focusing small droplets in ambient conditions by eliminating the production of droplets in the small than 0.5 microns and in some embodiments, smaller than 1 micron and by inhibiting droplet evaporation from the aerosolization source to the print nozzle. The current invention uses ultrasonic excitation frequencies or other aerosolization techniques that produce droplets in the range of 0.5 to 8 microns. In inventive embodiments, no small, difficult to focus droplets are present in the aerosol stream, and larger droplets are easily focused with larger-diameter aerodynamic lenses. Solvent vapor is combined with an aerosol diameter distribution that is shifted to diameters larger than diameters produced with the typical 1.6 MHz ultrasonic excitation or using Collison nebulizers. The aerodynamic lens system is then matched to the resulting droplet diameter distribution.

In embodiments of the invention the aerosol may be produced from an ink using various aerosolization methods. The ink may be a nanoparticle suspension in a solvent, or a solute dissolved in a suitable solution. In embodiments of the invention low-vapor pressure inks and aerosolization methods produce an aerosol droplet diameter distribution that is matched to the aerodynamic lens system of the printer. In a specific embodiment of the invention, d-limonene is used as a suspending medium for nanoparticle inks, enabling the production of a stable aerosol distribution with droplet diameters in the range of 2 to 4 microns. In still other inventive embodiments, this distribution contains $\sigma$, or even $2\sigma$ of all the droplets formed.

Embodiments of the inventive aerosol-based printing apparatus employ the use of an annular sheath flow surrounding an aerosol stream that propagates through a series of aerodynamic lenses matched to an aerosol distribution. The sheath flow provides hydrodynamic focusing of the aerosol-laden inner flow that is stretched and compressed by the outer flow. The amount of hydrodynamic focusing is proportional to the ratio of the total volume occupied by the sheath gas to that of the aerosol gas. Additional focusing of the aerosol stream is also accomplished through aerodynamic focusing, as the combined gas flows propagate through the lens assembly, passing through successively smaller lenses, with the gas undergoing a series of compressions and expansions that force progressively smaller droplets towards the flow axis.

As used herein optimum printing is defined as the minimum printed trace width and maximum trace edge definition that is achieved when the total gas flow rate, lens diameter, and droplet physical properties are matched to each stage of the aerodynamic lens assembly for a specific range of droplet diameters. The matched sheathed lens assembly used in embodiments of the invention is capable of printing with higher resolution than an unmatched system. It has been determined that an unmatched sheathed aerosol focusing assembly will produce narrow partially focused traces with randomly deposited unfocused droplets.

Embodiments of the inventive aerosol-based printing apparatus produce discreet patterns by shuttering a continuous stream of aerosol particles using a pneumatic shutter. In a specific inventive embodiment, the aerosol-based printing apparatus includes a print module, a process vision module, a part alignment module, a shutter assembly, a process control module, a gas humidifier, and a motion control module. The print module includes an aerosolization source, a pressure source, and a print head. The process vision module provides real-time viewing of the deposition process. The alignment module is used to define the vector distance between the axis of an alignment camera and one or more print heads for substrate alignment. The motion control module provides computer-controlled multi-axis motion of the substrate and coordinated shuttering of the aerosol stream. Embodiments of the invention are capable of printing features as small as 4 microns and as large as approximately 500 microns, at shuttering speeds typically between 10 and 250 milliseconds. It is appreciated that large features can be produced by contiguous passes of a given width thereby making for a feature widths over at least two orders of magnitude.

In a specific embodiment of the invention a dual action capping shuttering scheme is used in which the aerosol transport gas flow is diverted to the sheath gas flow, and an aerosol transport tube within the print module is closed off from the aerosolization source, completely interrupting the flow of aerosol droplets to the print module flow cell. Capping of the aerosol transport tube may be accomplished using a plunger mechanism that fills the entrance of the transport tube and disables residual pressure-driven flow of aerosol from the aerosol source to the flow cell.

Embodiments of the invention minimize the time required to transport aerosol droplets from an atomizer output port to the flow cell. Minimization of aerosol transport time is required to limit droplet settling and droplet evaporation thereby maintaining the match between the aerosol droplet distribution and the aerodynamic lens assembly. In a specific embodiment of the invention, an aerosol chamber is in direct communication with an upper chamber of the flow cell, so that aerosol is transported directly from the chamber to an aerosol tube fitted in the flow cell. Due to the minimized distance between the aerosol chamber and the upper chamber of the flow cell, the time required to re-establish aerosol flow to a substrate is minimized, and shuttering times may be reduced to less than 50 milliseconds.

In a specific embodiment of the present invention, a tunable filament extension atomization (FEA) process is employed to produce droplets with diameters in the range of 1.5 to 8 microns, with a droplet diameter dispersion, σ of less than approximately 2 microns. The use of filament extension atomization coupled with a sheathed aerosol-laden inner flow reduces the need for multiple aerodynamic lenses. Aerosol-based printing with a single sheathed aerodynamic lens is enabled when a sufficiently narrow droplet diameter distribution is produced using filament extension atomization or any other atomization process that produces a droplet diameter dispersion of less than 2 microns. In yet another embodiment of the invention, FEA is combined with an aerodynamic lens assembly or a single aerodynamic lens that produces a highly focused aerosol stream using aerodynamic focusing and little or no hydrodynamic focusing from a sheath gas. The reduced sheath gas flow rate of such an embodiment enables printing of high-definition traces due to the reduced production of overspray deposition caused by small droplets following the lateral flow of sheath gas that occurs as the aerosol stream impacts a surface.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to specify all permutations, combinations, and variations thereof exhaustively.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only, and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

Embodiments of the present invention offer a method and apparatus for aerosol-based direct printing of discrete patterns using a multi-lens aerodynamic focusing assembly and a material shuttering assembly that is internal to the print head of the apparatus. The apparatus of the invention produces discrete patterns by shuttering a continuous stream of aerosol particles using a pneumatic shutter. According to embodiments, the apparatus includes a print module, a process vision module, a part alignment module, a shutter assembly, a process control module, and a motion control module. The print module includes an aerosolization source, a pressure source, and a print head. The process vision module provides real-time viewing of the deposition process. The alignment module is used to define the vector distance between the axis of an alignment camera and one or more print heads, and for substrate alignment. The process control module provides computerized control and monitoring of gas flow rates and process temperature and monitoring of the system pressure. The motion control module provides computer-controlled multi-axis motion of the substrate and coordinated shuttering of the aerosol stream. Rao, N. P., "Aerodynamic focusing of particles in viscous jets," Journal of Aerosol Science, 24, Issue 7, October 1993, Pages 879-892.

The invention is capable of printing features from 4 to even larger than 500 microns at shuttering speeds as fast as 10 milliseconds.

Referring now to the figures, FIG. 1A shows an inventive embodiment of the aerosol-based printing apparatus shown generally at 10 that overcomes the issue of solvent vapor condensation and the need for a condensation purge cycle. In FIG. 1A an evaporative cooling method is used where a dry gas flows through a heated platen 12 heated by at least one cartridge heaters 14 and through a volume 16 maintained over a liquid reservoir of the ink solvent. Solvent is evaporated as the dry gas flows over the liquid surface LS, cooling the gas. The solvent vapor-laden sheath gas flows out of the reservoir and into the ink cartridge 18 at port 20 as a vapor-laden aerosol transport gas that exits the solvent reservoir 22 at port 24 and enters the ink cartridge at port 26. The vapor-laden sheath gas is combined with the vapor-laden aerosol transport gas at a flow cell 28. The ink cartridge 18, flow cell 28, and atomizer base 30 are maintained at a temperature higher than that of the vapor-laden sheath and aerosol gases. The apparatus of FIG. 1A minimizes or eliminates overspray and satellite droplet deposition and solvent condensation, and allows for continuous unassisted printing, with operating time limited only by the rate of ink consumption and the volume of ink loaded in the ink cartridge. Embodiments of the present invention are capable of continuous unassisted printing for more than twenty-four hours without the need for purge or cleaning cycles.

The ink cartridge 18 in some inventive embodiments, further includes a cold plate 32 and a fluid dispense tip 34. An ultrasonic transducer 36 nebulizes an ink sample, forming an aerosol that is transported from the atomizer base 30 to the flow cell 28. A sheath gas enters the atomizer base 30 through port 20 and forms an annular coaxial flow with the aerosol-laden gas as the combined flow passes through the flow cell. Liu, P. "Generating Particle Beams of Controlled Dimensions and Divergence: II. Experimental Evaluation of Particle Motion in Aerodynamic Lenses and Nozzle Expansions", Aerosol Science and Technology, Volume 22, 1995. The flow cell 28 in some inventive embodiments includes a dual action, shutter mode-print mode device as further detailed with respect to FIGS. 2 and 3.

Figure 1B:
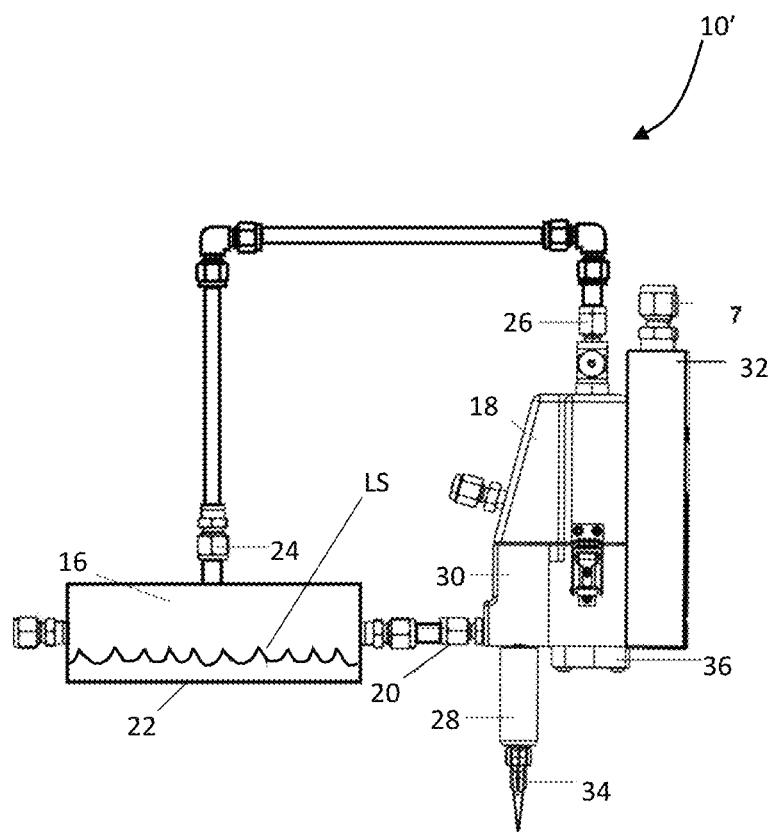
FIG. 1B is a schematic of an inventive apparatus of FIG. 1A absent the heated platen for adding an unheated solvent vapor to the aerosol and sheath gas flow while eliminating vapor condensation.

FIG. 1B shows an inventive embodiment of the aerosol-based printing apparatus shown generally at 10' in which like reference numerals have the meaning ascribed thereto with respect to FIG. 1A. The apparatus 10' absent the heated platen for adding an unheated solvent vapor to the aerosol and sheath gas flow while eliminating vapor condensation. It is appreciated that additional control of size distribution of ink droplets in apparatus 10' imparted through resort to transient laser pulses to modify the thermal environment therein in response to feedback from sensor. A sensor operative herein illustratively includes a vapor pressure sensor, a thermocouple, a dynamic light scattering probe, or a combination thereof. FIG. 1B shows an apparatus 10' for adding solvent vapor to the aerosol and sheath gas flows without the use of a heater. The apparatus of FIG. 1B uses a high vapor pressure solvent held in chamber 22. The solvent has sufficient volatility to achieve a nearly saturated vapor pressure at room temperature. The vapor-laden aerosol and sheath flows are delivered to the warmer ink cartridge 18 and flow cell 4 and exit the lens assembly 34. The vapor-laden combined flows exit the lens assembly and deposit a thin film on the substrate that enhances surface wetting of the aerosol improving the edge definition and surface roughness of the deposited ink. As the vapor-laden sheath gas exits the lens assembly into the ambient pressure, expansion and cooling of the vapor takes place and a thin condensation layer may be deposited on the substrate. The condensation layer improves printed trace edge definition by improving surface wetting of the aerosol.

In one embodiment of the present invention, a dual action capping shuttering scheme is used in which the aerosol transport gas flow is diverted to the sheath gas flow, and an aerosol transport tube within the print module is closed off from the aerosolization source, interrupting the flow of aerosol droplets to the print module flow cell. In some inventive embodiments, the flow of droplets is complete interrupt for an interval of time. Capping of the aerosol transport tube can be accomplished using a plunger mechanism that fills the entrance of the transport tube and disables residual pressure-driven flow of aerosol from the aerosol source to the flow cell.

Figure 2:
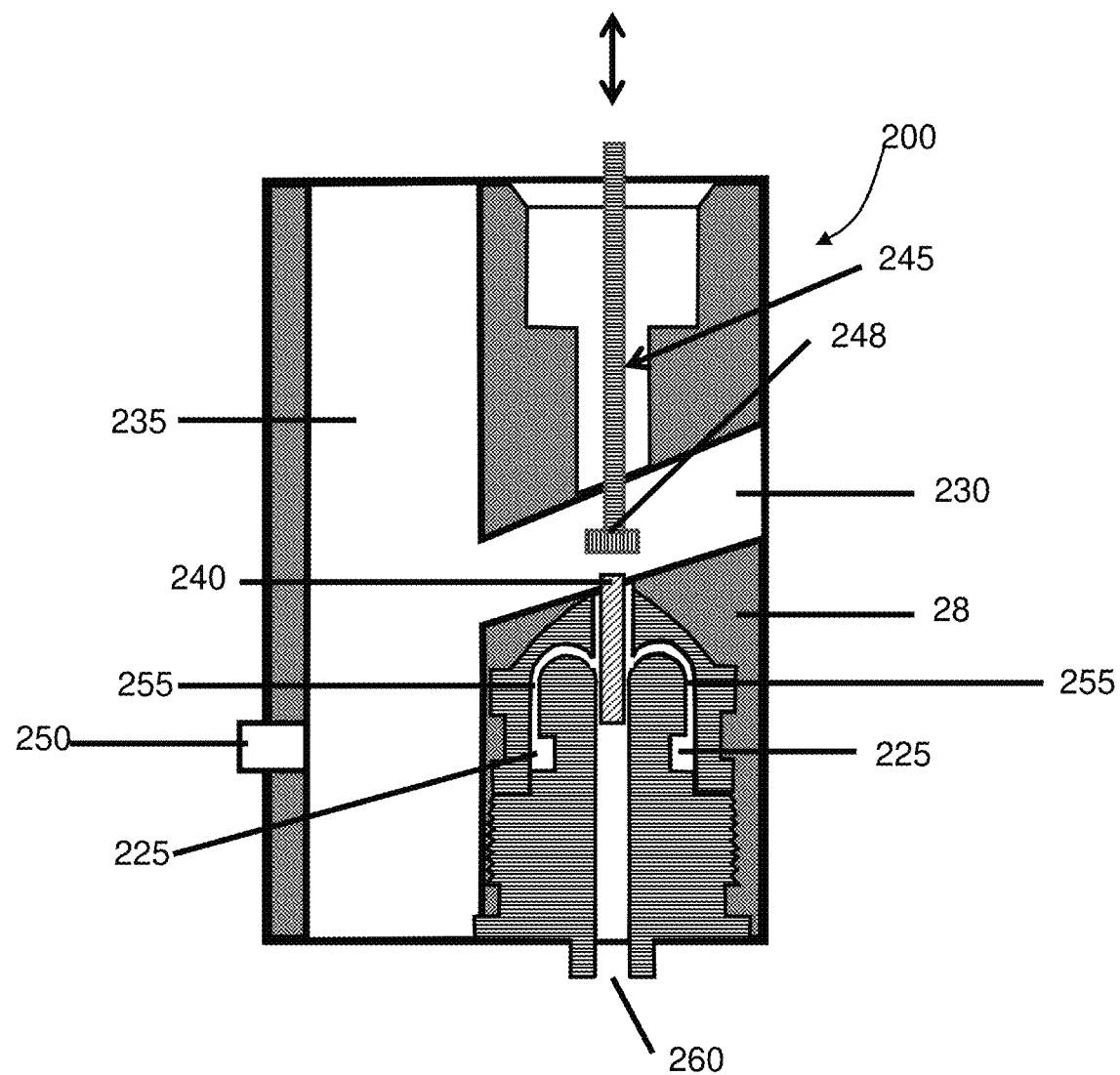
FIG. 2 is a plan view of an apparatus for shuttering an inventive aerosol stream using a capping method.

As shown with respect to FIG. 2, a dual-action shutter device is shown at 200. In the print mode, a transport gas enters the apparatus at port 250. During printing, the aerosol transport gas entrains aerosol in an aerosol chamber 235 to from an aerosol-laden transport gas and delivers the aerosol transport gas to the flow cell 28 by passing through flow cell channel 230. It is appreciated that aerosol-laden transport gas as delivered via port 24 per FIG. 1A or 1B is also operative herein as feedstock to channel 230 and aerosol tube 240. In some inventive embodiments, an aerosol tube 240 inserts within the flow cell channel 230 and extends therefrom. While the aerosol tube 240 is depicted as being cylindrical, it is appreciated that the aerosol tube 240 is readily formed to include one or more of an internal restrictor that reduces the internal diameter along at least one point along the length thereof, a flare extending from the aerosol tube into the aerosol chamber 235, or a combination thereof. It is appreciated that the inner dimensions of the aerosol tube 240 and transport gas flow rates are important factors in the control of droplet size. A sheath gas enters the flow cell through ports 225 and travels through conduits 255 to combine with the aerosol-laden transport gas exiting the bottom of the aerosol tube 240 to form a directional flow exiting from the channel 260 of flow cell 28. During shuttering mode, the aerosol transport gas is diverted and combined with the sheath gas in a remote process control module (not shown), and the aerosol tube 240 if present, else the flow cell channel 230 is capped by a plunger 245 selectively movable between the disengaged position shown and a capping position in which the plunger head 248 contacts the top of the aerosol tube 240 if present, else the flow cell channel 230. It is appreciated that the plunger head 248 can achieve shuttering without completely forming a seal with the aerosol tube 240, if present, else the flow cell channel 230. Partial shuttering is readily achieved by a size mismatch therebetween, an offset therebetween, or partial extension of the plunger 245 towards opposing surface of the aerosol tube 240 or the flow cell tube 230.

Another aspect of the present invention is the ability to reduce of the time required to transport aerosol droplets from an atomizer output port to a flow cell. By limiting aerosol transport time, droplet settling and droplet evaporation are inhibited thereby maintaining the match between the aerosol droplet distribution and the aerodynamic lens assembly. In some inventive embodiments as shown in FIG. 2, the aerosol chamber 235 is in direct communication with the flow cell 28, so that aerosol is transported directly from the chamber 235 to an aerosol tube fitted in the channel 260 to limit aerosol droplet transit time. The channel 260 is routinely coupled to a fluid dispense tip 34 as shown in FIGS. 1A and 1B. Due to the minimized distance between the aerosol chamber 235 and the flow cell 28, the time required to re-establish aerosol flow to a substrate is limited, and shuttering times are typically from 5 to 100 milliseconds.

Figure 3:
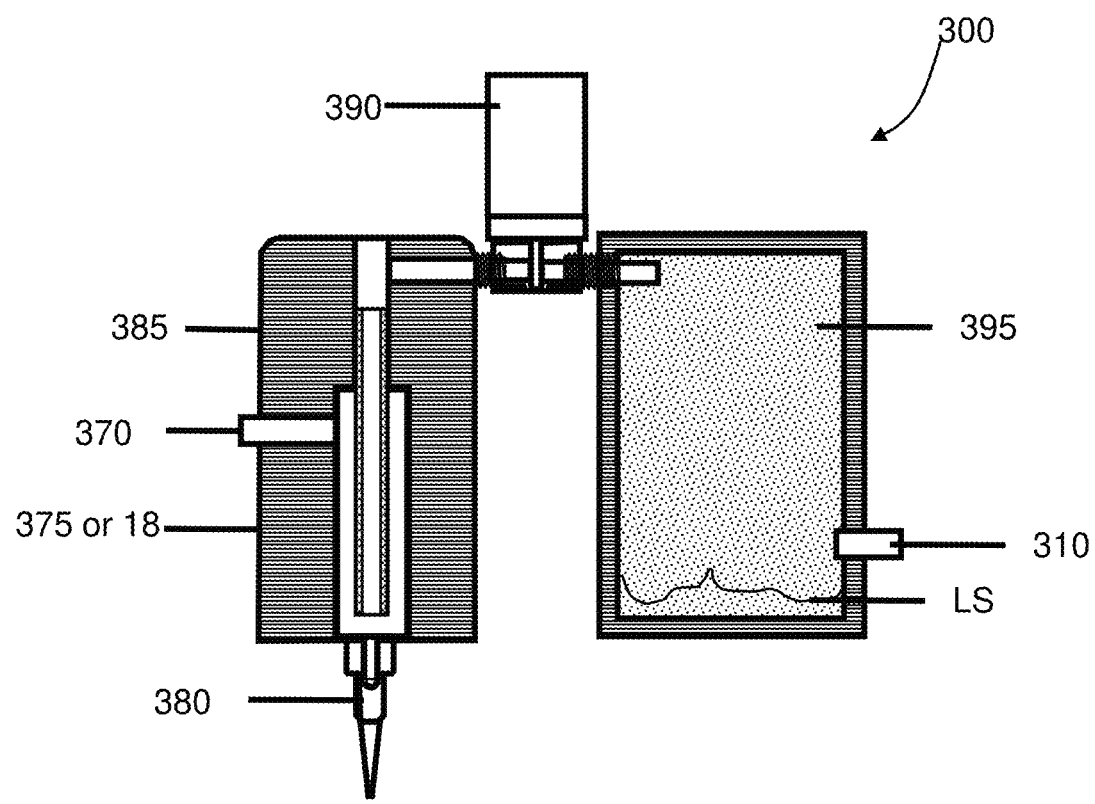
FIG. 3 is a plan view of an apparatus for shuttering an inventive aerosol stream using a shutoff valve.

With reference to FIG. 3, another dual-action shutter device is shown generally at 300. During printing mode, a transport gas enters an aerosol chamber 395 at port 310. The aerosol chamber 395 contains a liquid surface LS from which vapor is entrained to from aerosol particles. The aerosol-laden gas is transported to flow cell 375 or 18 by passing through valve 390. The valve 390 illustratively including a plunger valve per FIG. 2, a needle valve, a diaphragm valve, a globe value, a pinch valve, or a solenoid valve. The aerosol-laden transport gas enters an aerosol tube 385 and is combined with a sheath gas flow that enters the flow cell through port 370. The combined flows are propagated through an aerodynamic lens assembly 380. In shutter mode, valve 390 restricts aerosol-laden transport gas from entering the aerosol tube 385.

Figure 4:
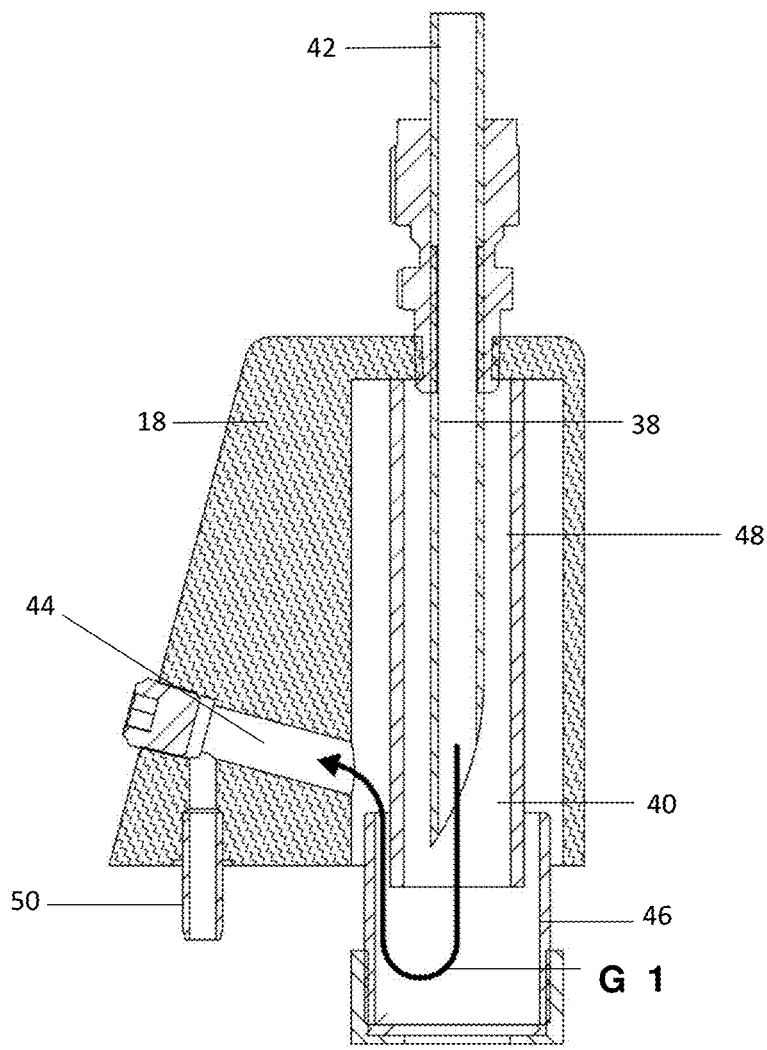
FIG. 4 is a plan view of a print head inclusive of an interchangeable ink cartridge, an atomizer base, a cold plate, a flow cell, and a fluid dispense tip that may be used with the apparatus of FIG. 1.

FIG. 4 shows a cross sectional view of the ink cartridge 18 of FIG. 1A or 1B. The ink cartridge 18 has an interior surface 38. The ink sample is held in a detachable vial 46. An aerosol transport gas enters the cartridge through inlet aerosol gas tube 42. Aerosolized ink is transported from the aerosol chamber 40 to the flow cell 28 through a slanted channel 44 and vertical channel 50, as detailed in U.S. Pat. No. 10,086,622 B2.

According to embodiments of the present invention, the aerosol gas input provided through inlet aerosol gas tube 42 and the aerosol output ports to the slanted channel 44 are isolated from the ink spout formed during the aerosolization process. Ink film formed on either input or output ports will cause intermittent aerosol delivery, resulting in pulsed deposition at a substrate. In the embodiment of FIG. 2 the inlet aerosol gas tube 42 is positioned so that the gas input therethrough is shielded from the ink spout, and the sample ink held in the detachable vial 46 is isolated from the slanted channel 44 by an internal baffle 48. A constant flow of aerosol-laden gas exits the cartridge at port 50 suitable for aerosol printing. The ink cartridge and baffles are typically formed from aluminum but may also readily be formed from more chemically resistance materials such as stainless steel or polyether ether ketone (PEEK). The internal baffle 48 is generally a cylindrical shell that functions to isolate the aerosol output channel 44 from the ink spout. It is appreciated that an internal baffle 48 operative in the present invention creates a modified gas flow G.

The internal baffle is within an aerosol chamber and according to the present invention has a variety of shapes as defined by a bottom view or cross-sectional view. The shape of a baffle is selected to ensure there is a degree of isolation of the aerosol output channel from the ink spout so as to inhibit aerosol settling and fluid buildup to such a degree that fluid accumulation within the ink cartridge and transport conduits need not be purged for at least 24 hours. As a result, printing can occur for at least 24 uninterrupted hours.

Internal baffle shapes operative herein and as disclosed in co-pending PCT Application PCT/US2020/52616 illustratively include planar (FIG. 5A), arcuate (FIG. 5B), split cylindrical (FIGS. 5C-5E), angular (FIG. 5F), and complex shapes of S-shaped (FIG. 5G), and Y-shapes (FIGS. 5H-5I). With respect to FIGS. 5A-5I, these shapes typically define an angle α that as shown varies from 5 to 180 degrees. Factors relevant in selecting a given shape for the internal baffle include aerosol droplet size, ink surface tension, temperature, inlet gas flow rate, and gap dimensions along the gas flow G.

As used herein, "continuous printing" is defined as print deposition of ink droplets on a substrate for at least 24 hours without resort to a purge cycle, regardless of whether the purge cycle is automated or manually performed. In contrast, conventional aerosol-based ink cartridges are only capable of about 30 minutes of continuous printing.

Figure 6A:
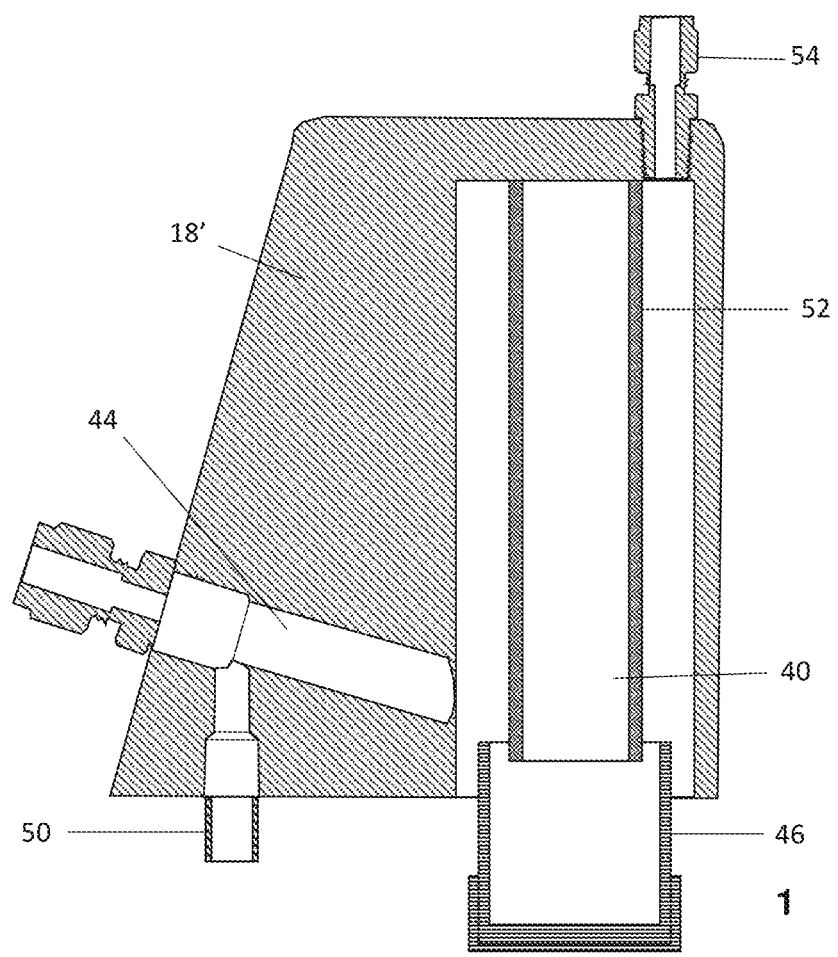
FIG. 6A is a cross sectional view of the ink cartridge of FIG. 4 with a single internal baffle embodiment.
Figure 6B:
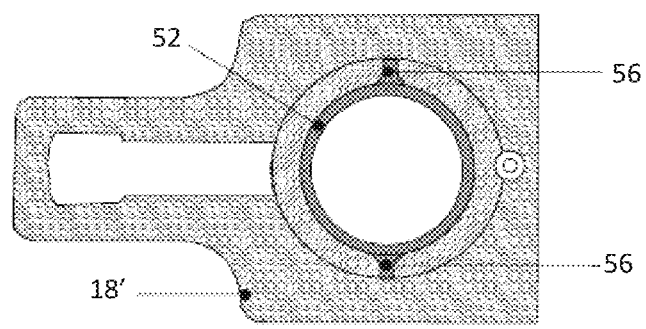
FIG. 6B is a bottom view of the configuration of FIG. 6A showing the orientation of the ribs of the single baffle.
Figure 6C:
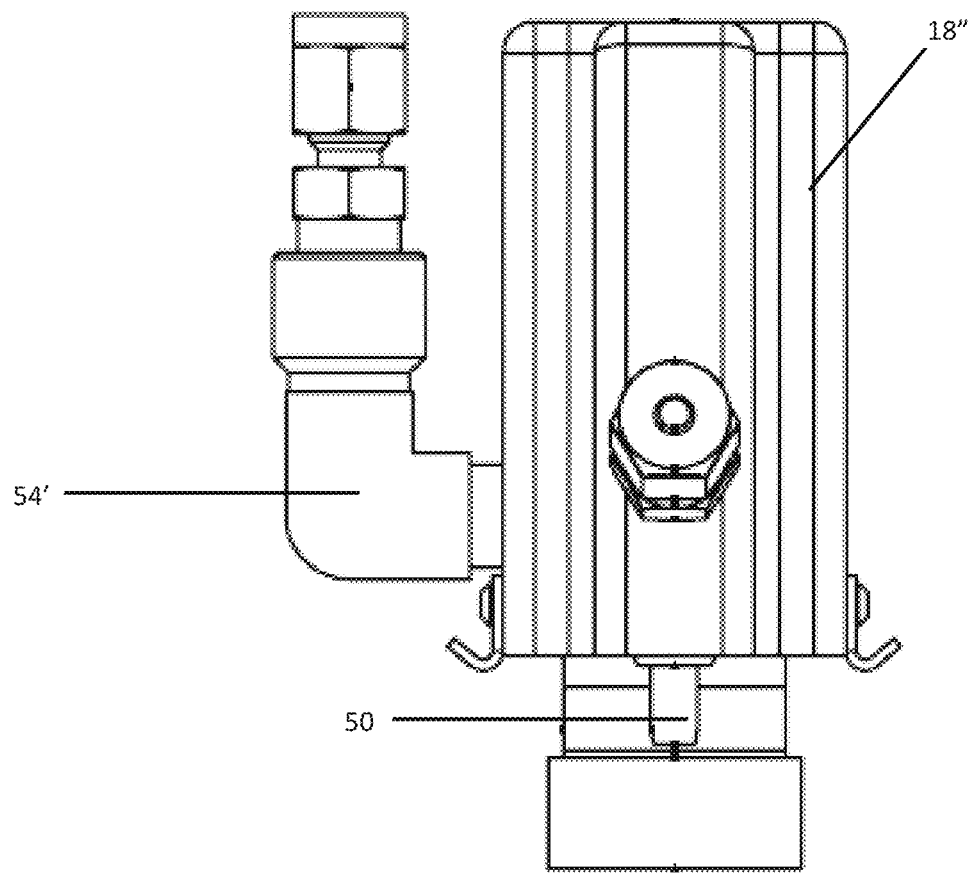
FIG. 6C is a drawing of the configuration of FIG. 4A with a side entry gas inlet.

Additional embodiments of ink cartridges that may be used with the inventive apparatus of FIGS. 1 and 1B and as disclosed in co-pending PCT Application PCT/US2020/52616 are further detailed in FIGS. 6A-11D. A compatible ink cartridge is shown in FIG. 4 in which like reference numerals have the aforementioned meanings ascribed thereto. An ink cartridge 18' is provided that includes a single baffle 52 and an aerosol gas input that enters the cartridge along the outside of the baffle 52 via input port 54. As illustrated in FIG. 6B, a set of ribs 56 force the aerosol gas downward, along the baffle 52 and across the bottom of the aerosol chamber 40. The configurations of FIGS. 6A-6C prevent entrainment of fluid at the gas input port 54 and at the aerosol output port 50. A constant flow of aerosol-laden gas exits the cartridge at port 50. Stable aerosol transport is achieved in the present invention by isolating the fluid spout created by the atomization process from the input and output ports of the ink cartridge. As ultrasonic energy is coupled into the ink, the surface of the ink begins to oscillate, and a spout is formed near the center of the fluid. As shown in FIGS. 6A-6C, isolation of the spout from the input and output ports is accomplished using a single baffle and a series of vertical ribs that force the aerosol gas to flow downward into the lower part of the ink cartridge. According to embodiments, aerosolized droplets are entrained in the transport gas and transported from the ink cartridge to the flow cell. FIG. 6C shows a configuration of a cartridge 18" similar to the configuration of FIG. 6A, where the aerosol gas enters the aerosol chamber through gas input port 54' on the side of the cartridge and near the bottom of the aerosol chamber. The aerosol exits the cartridge at port 50. The configuration of FIG. 6C may also be used with an internal baffle without ribs.

Figure 7A:
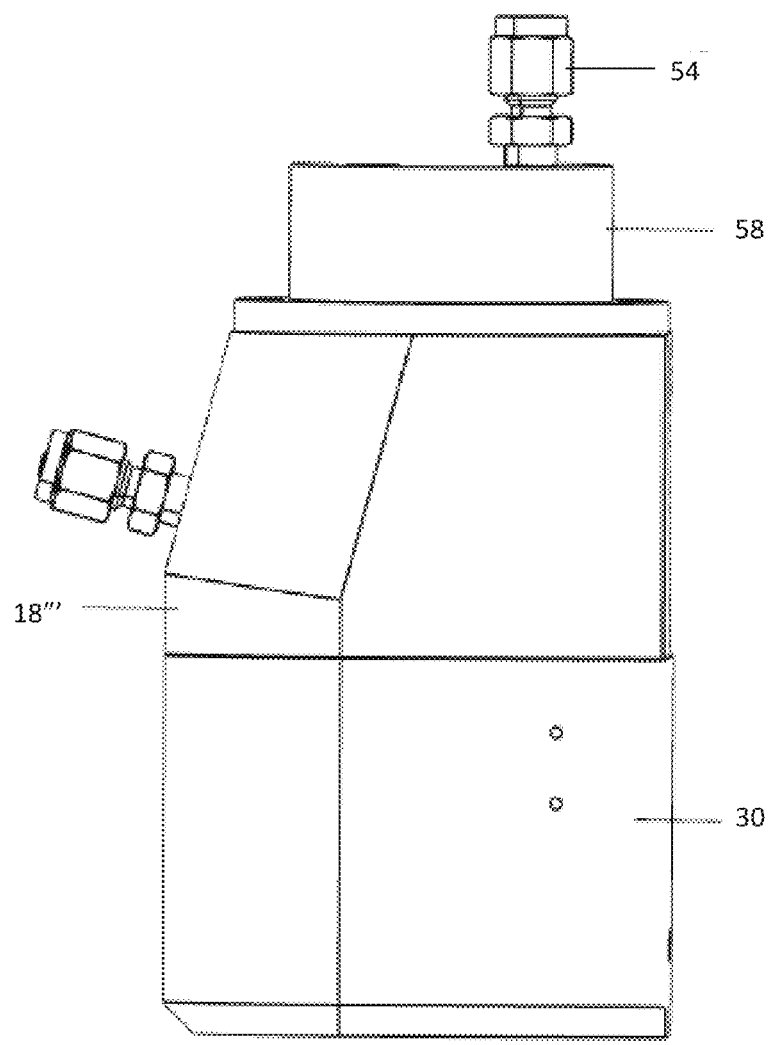
FIG. 7A is a side view of another embodiment of a print head inclusive of an interchangeable ink cartridge, and an atomizer base that may be used with the apparatus of FIG. 1A.
Figure 7B:
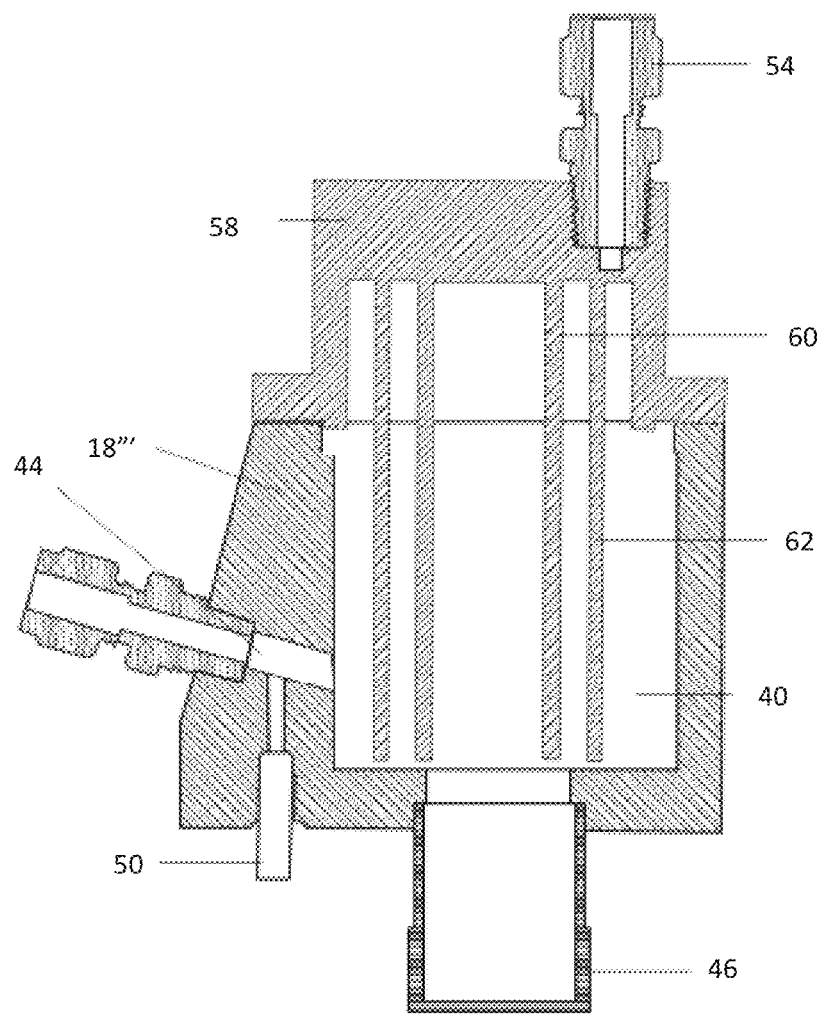
FIG. 7B is a cross sectional view of the ink cartridge of FIG. 7A showing a nested baffle configuration.

According to the embodiment of the ink cartridge 18''' shown in FIG. 7A, that may be used in the inventive apparatus of FIG. 1A or 1B includes an atomizer base 30, and an ink cartridge cap 58. The flow paths of the input aerosol gas and the aerosol-laden output gas are generally shown in FIG. 7B that is the cross-sectional view of FIG. 7A. As shown in FIG. 7B, the ink cartridge 18''' includes a set of nested baffles 60 and 62 to isolate the gas input port 54 and output from the ink spout 50. The aerosol transport gas enters the cartridge at gas input port 54, which is positioned off-axis with respect to the aerosol chamber axis and the ink spout. The aerosol gas flows downward into the aerosol chamber 40 and across the bottom of the baffles 60 and 62. The interior baffle 60 prevents fluid entrainment into the slanted output channel 44 and isolates the gas input from the ink spout 50, while the exterior baffle 62 forces the aerosol gas to flow downward into the most dense region of aerosol. A constant flow of aerosol-laden gas exits the cartridge at ink spout 50. The two internal concentric cylindrical baffles (60, 62) are used to isolate the ink spout 50 from the gas input 54 and aerosol output ports of the ink cartridge 18'''. The nested baffle configuration eliminates fluid entrainment in the gas and aerosol flow paths.

Figure 8A:
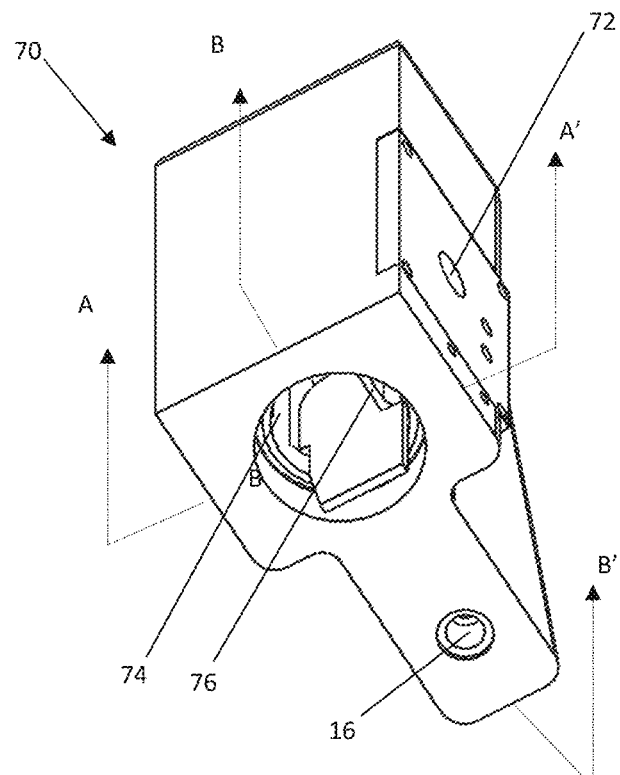
FIG. 8A is a first perspective view of an alternate ink cartridge that may be used in the present invention.
Figure 8B:
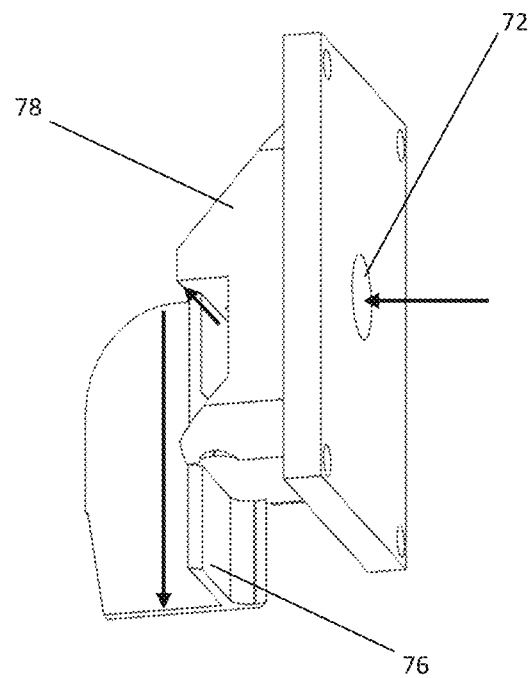
FIG. 8B is a perspective view of a portion of the aerosol chamber and baffle insert of FIG. 8A.
Figure 8C:
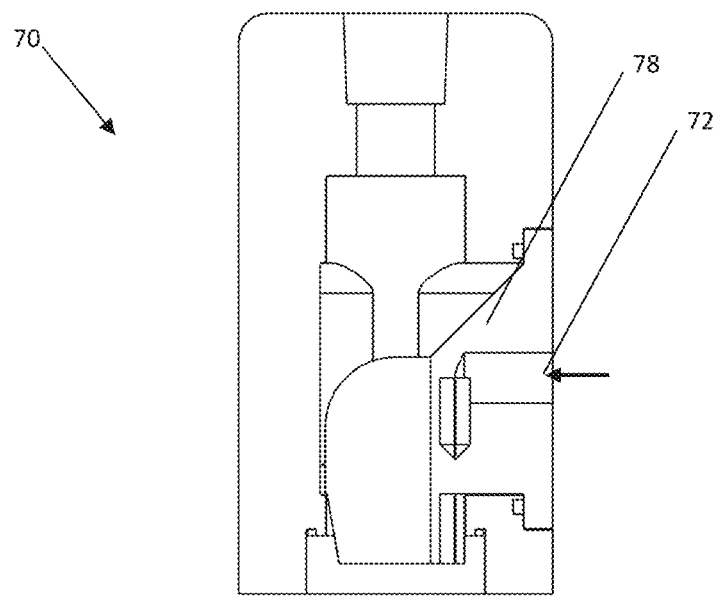
FIG. 8C is a cross-sectional view of the insert of FIG. 8A along the plane A-A'.
Figure 8D:
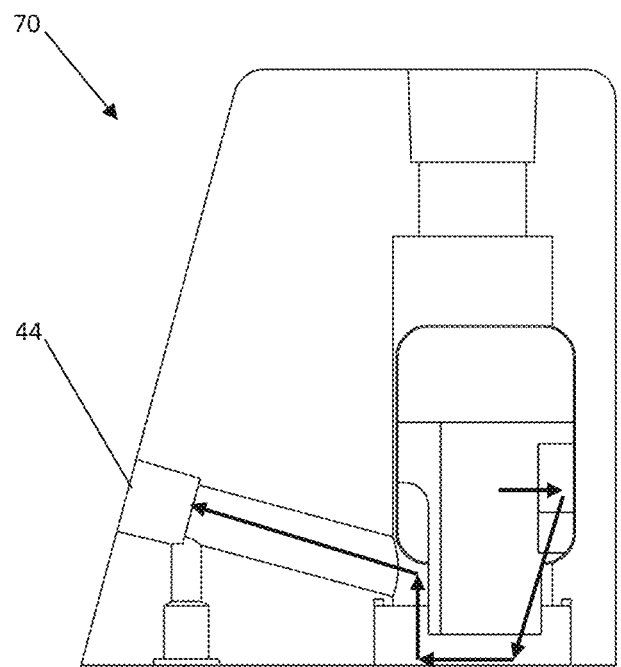
FIG. 8D is a cross-sectional view of the insert of FIG. 8A along the plane B-B'.

As shown in the following drawings, the detachable vial 46 is not shown to better illustrate the internal baffle and the effects thereof on the aerosol gas flow path as shown by the arrows in the figures. FIG. 8A is a first perspective view of an alternate ink cartridge 70 showing the aerosol gas inlet 72, the aerosol chamber 74, and baffle insert 76. FIG. 8B is a perspective view of a portion of the aerosol chamber 74 and baffle insert 76 of FIG. 8A that shows the complex shaped aerosol gas diverter 78 and the backward gas flow. FIG. 8C is a cross-sectional view of the insert of FIG. 8A along the plane A-A' that shows the aerosol gas input 72 and aerosol gas diverter 78. FIG. 8D is a cross-sectional view of the insert of FIG. 8A along the plane B-B' that shows the aerosol gas flow path as it proceeds up the slanted output channel 44 and isolates the gas input 72 from the ink spout 50.

Figure 9A:
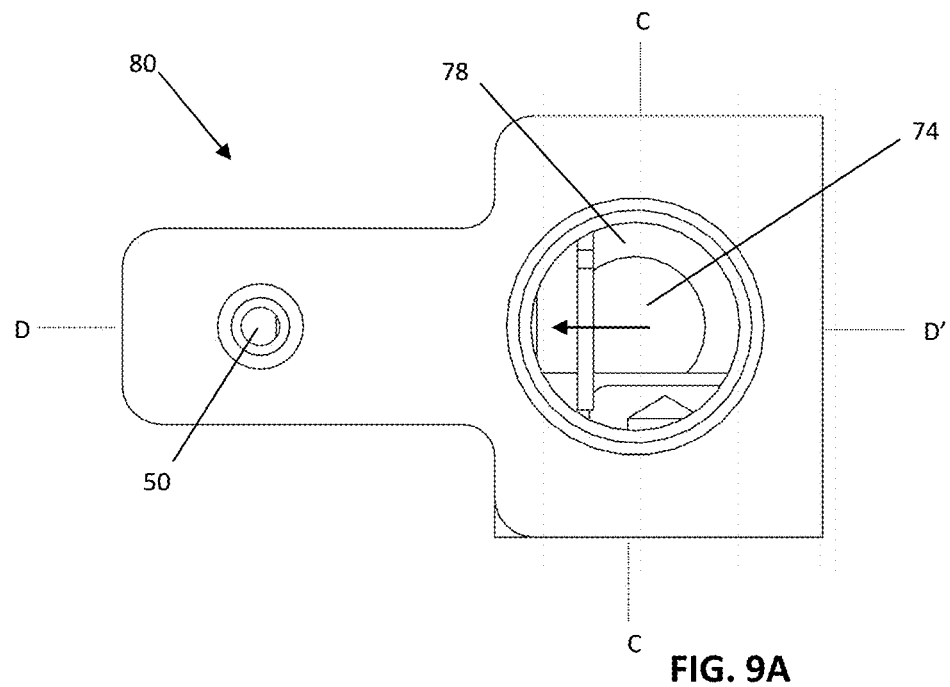
FIG. 9A is a bottom view of another embodiment of a portion of the aerosol chamber and baffle insert in an ink cartridge that may be used in the present invention.
Figure 9B:
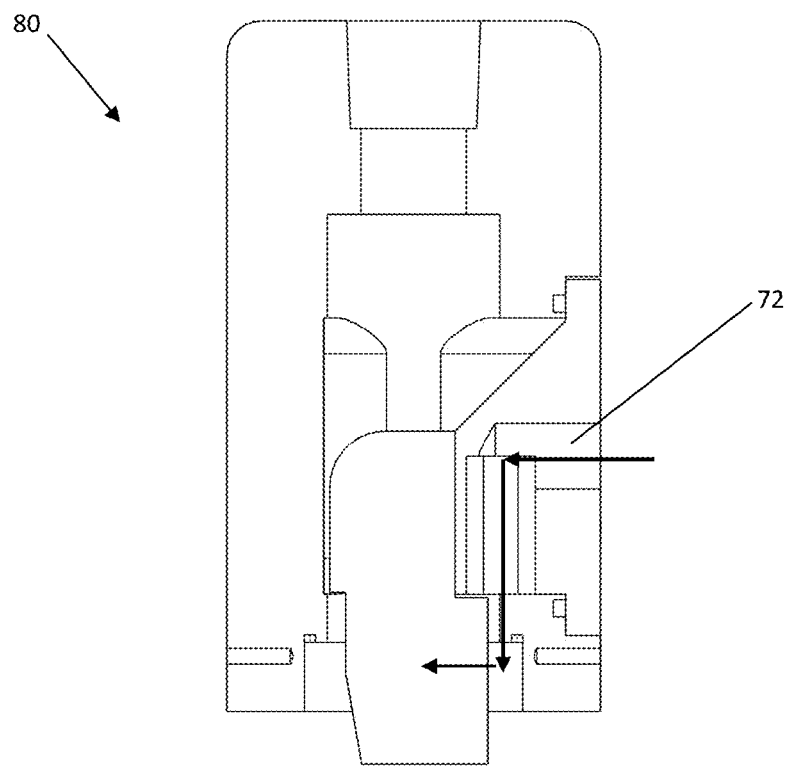
FIG. 9B is a cross-sectional view of the insert of FIG. 9A along the plane C-C'.
Figure 9C:
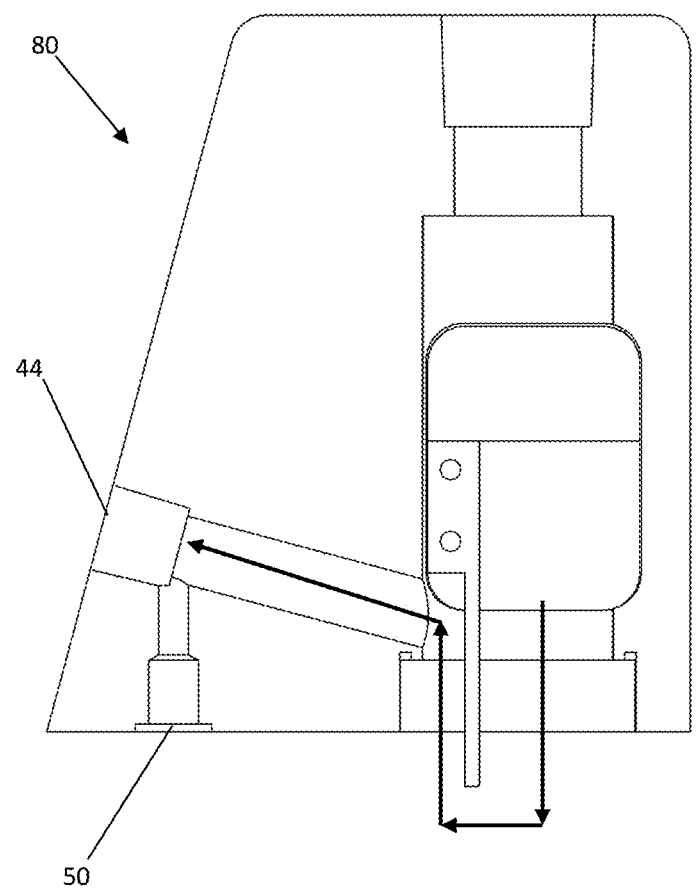
FIG. 9C is a second perspective view of the insert of FIG. 9A along the plane D-D'.

FIG. 9A is a bottom view of another embodiment of a portion of the aerosol chamber 74 and baffle insert 76 in an ink cartridge 80. FIG. 9B is a cross-sectional view of the insert of FIG. 9A along the plane C-C'. FIG. 9C is a second perspective view of the insert of FIG. 9A along the plane D-D'.

Figure 10A:
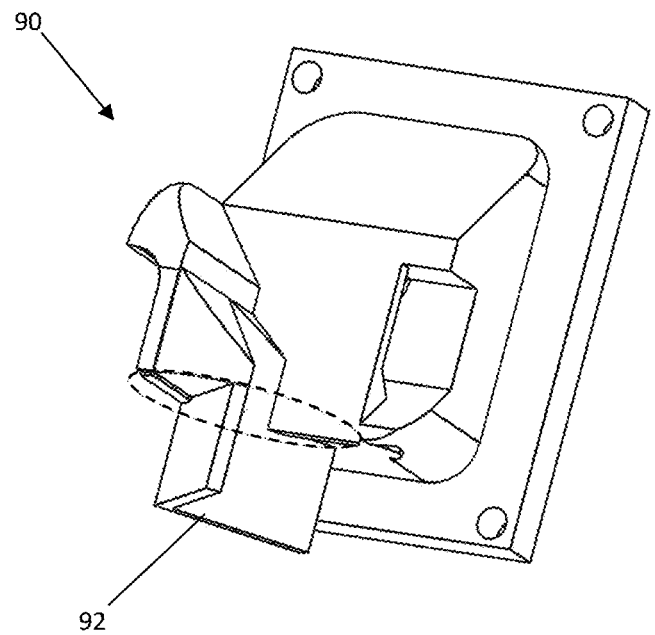
FIG. 10A is a first perspective view of another embodiment of an aerosol chamber and baffle insert that may be used in embodiments of the invention.
Figure 10B:
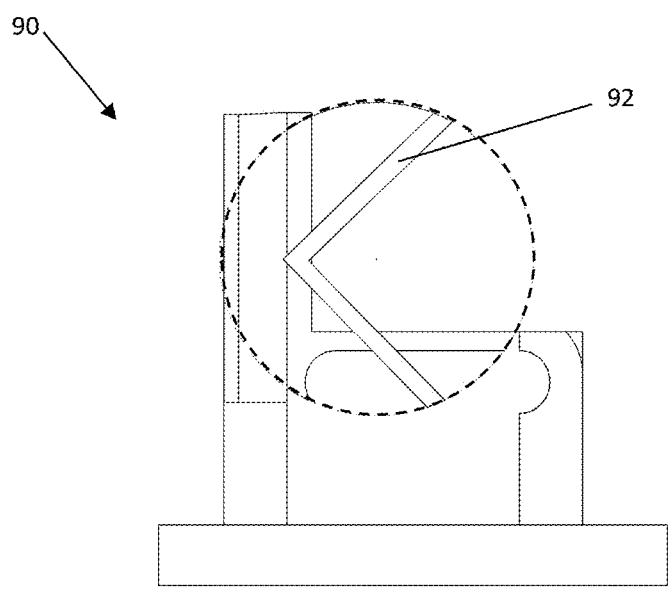
FIG. 10B is a partial cutaway view around the circle in the lower left of the insert of FIG. 10A.
Figure 10C:
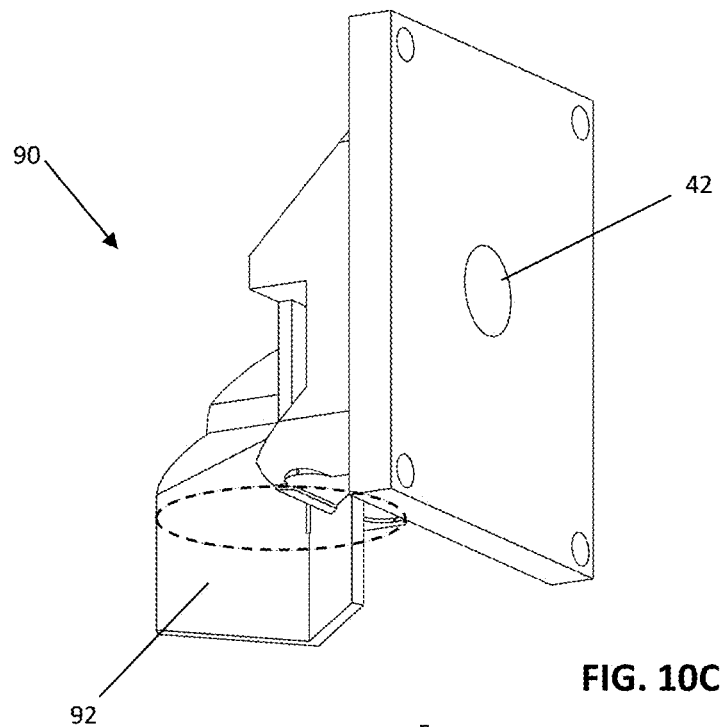
FIG. 10C is a second perspective view of a portion of the aerosol chamber and baffle insert of FIG. 10A.
Figure 10D:
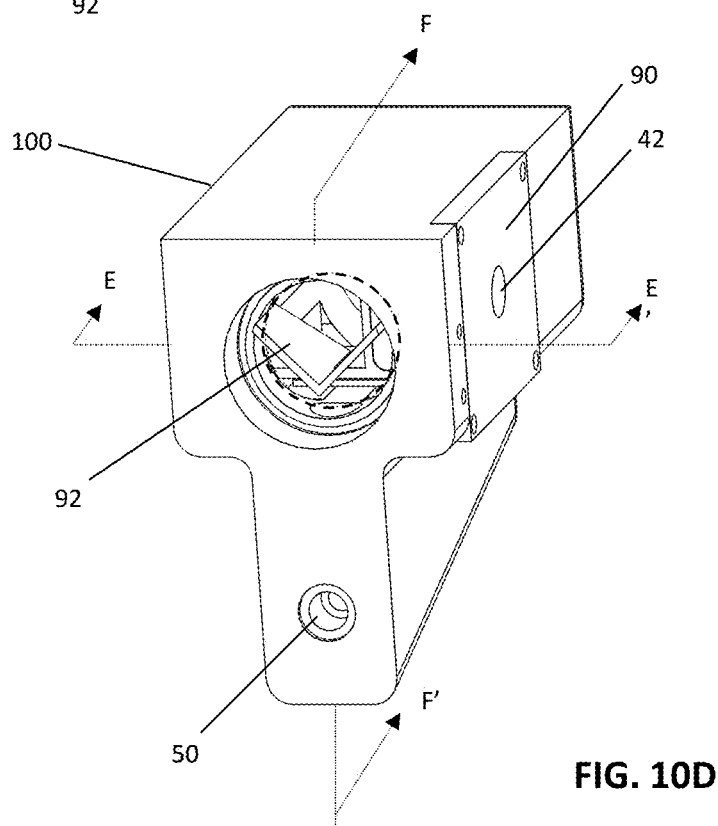
FIG. 10D is a bottom perspective view of the upper portion of the aerosol chamber and baffle insert of FIG. 10A in an inventive ink cartridge.
Figure 10E:
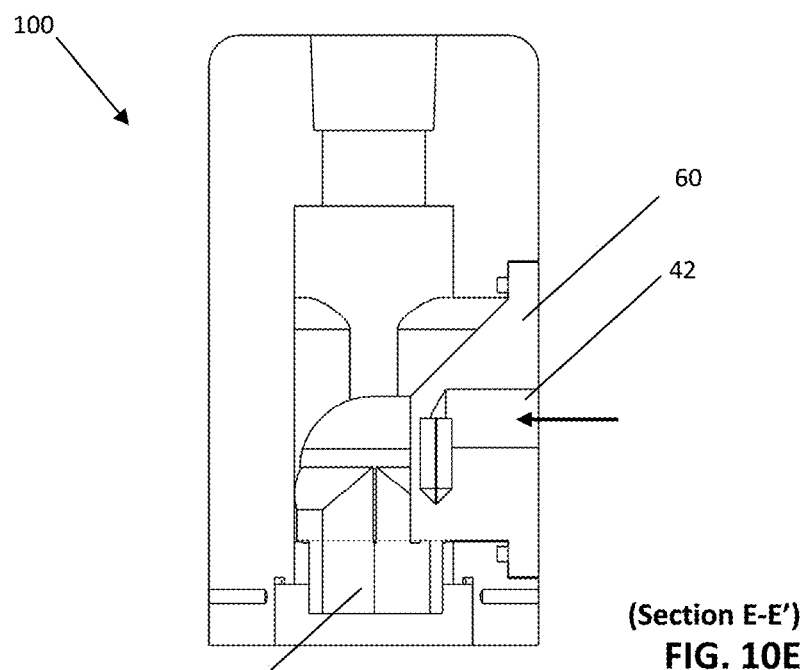
FIG. 10E is a cross-sectional view of the insert of FIG. 10D along the plane E-E'.
Figure 10F:
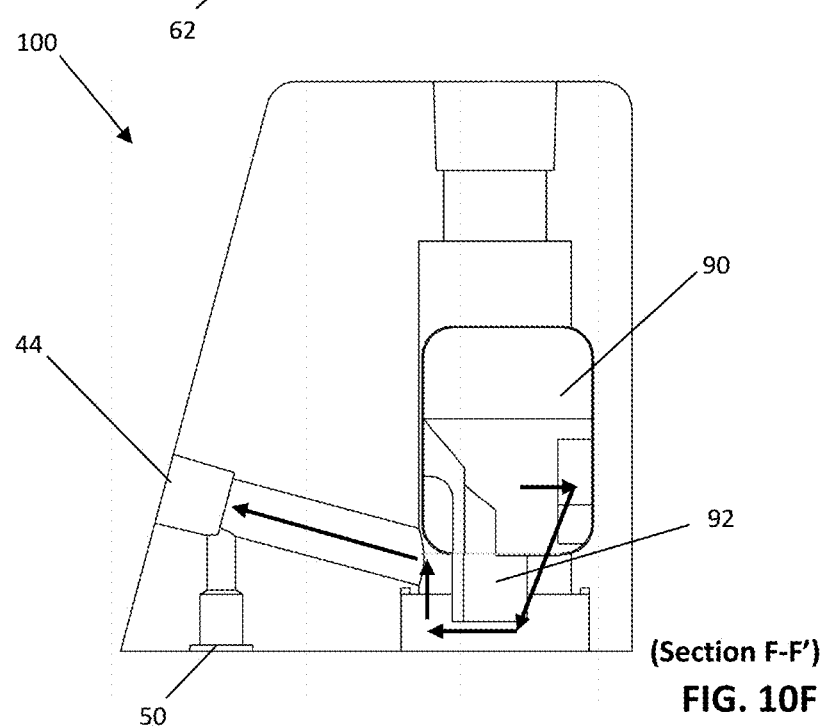
FIG. 10F is a cross-sectional view of the insert of FIG. 10D along the plane F-F'.

FIG. 10A is a first perspective view of another embodiment of aerosol chamber and baffle insert 90 that acts as an aerosol gas diverter with an angular baffle 92. FIG. 10B is a partial cutaway view around the dotted line circle in the lower left of the insert 90 of FIG. 10A. FIG. 10C is a second perspective view of a portion of the aerosol chamber and baffle insert 90 of FIG. 10A. FIG. 10D is a bottom perspective view of the upper portion of the aerosol chamber and baffle insert 90 of FIG. 10A in an inventive ink cartridge 100. FIG. 10E is a cross-sectional view of the baffle insert 90 of FIG. 10D along the plane E-E'. FIG. 10F is a cross-sectional view of the baffle insert 90 of FIG. 10D along the plane F-F'.

Figure 11A:
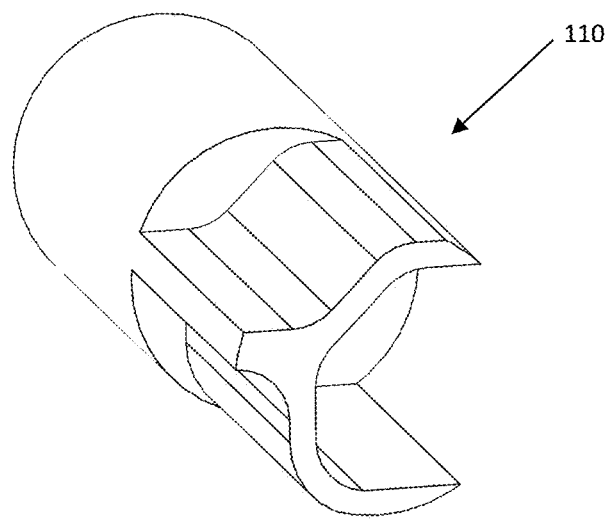
FIG. 11A is a perspective view of another embodiment of a portion of an aerosol chamber and baffle insert that may be used in the invention.
Figure 11B:
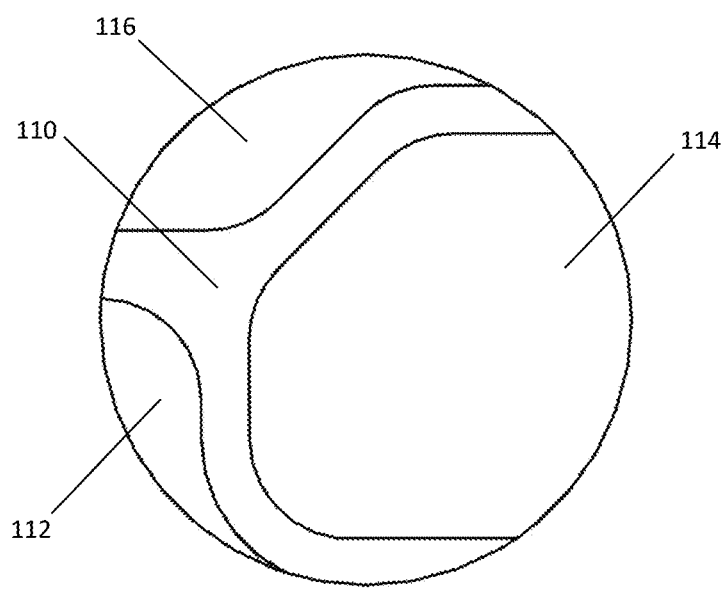
FIG. 11B is an enlarged bottom view of insert of FIG. 11A.
Figure 11C:
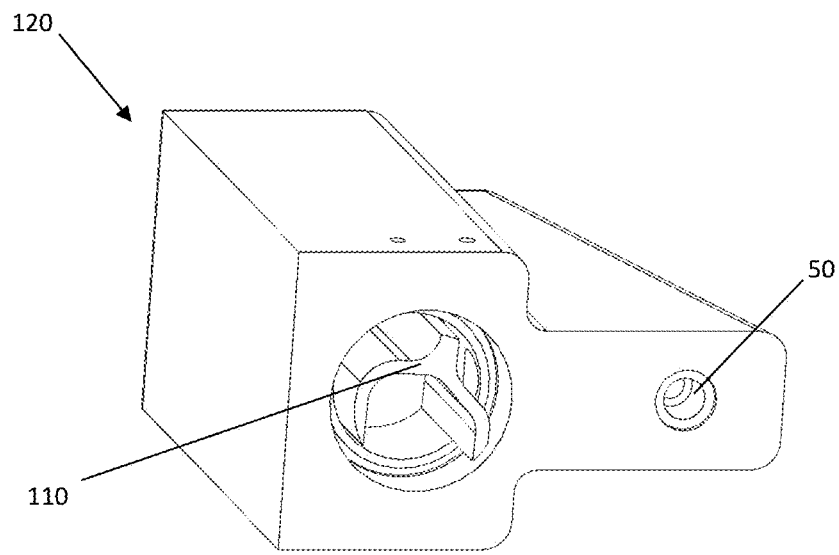
FIG. 11C is a bottom perspective view of the insert of FIG. 11A in the context of an ink cartridge.
Figure 11D:
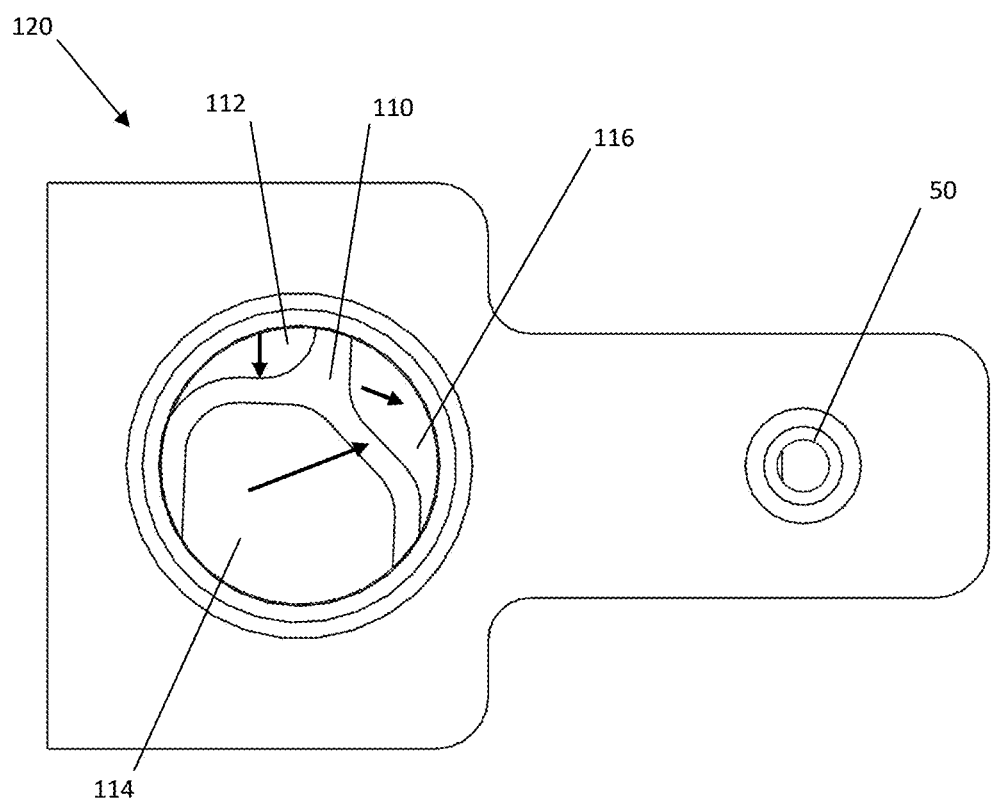
FIG. 11D is a bottom view of the cartridge of FIG. 11C.

FIG. 11A is a perspective view of another embodiment of a portion of an aerosol chamber and baffle insert 110. FIG. 11B is an enlarged bottom view of baffle insert 110 of FIG. 11A that shows the division of the aerosol chamber into an aerosol gas input region 112, an aerosol generation chamber 114, and an aerosol ink laden output region 116. FIG. 11C is a bottom perspective view of the baffle insert of FIG. 11A in the context of an ink cartridge 120. FIG. 11D is a bottom view of the ink cartridge 120 of FIG. 11C.

It is to be understood that the footprint of the embodiments of ink cartridges (18, 18', 18'', 18''', 70, 80, 100, 120) are equivalent and allow for interchangeable use on a printing machine.

Figure 12:
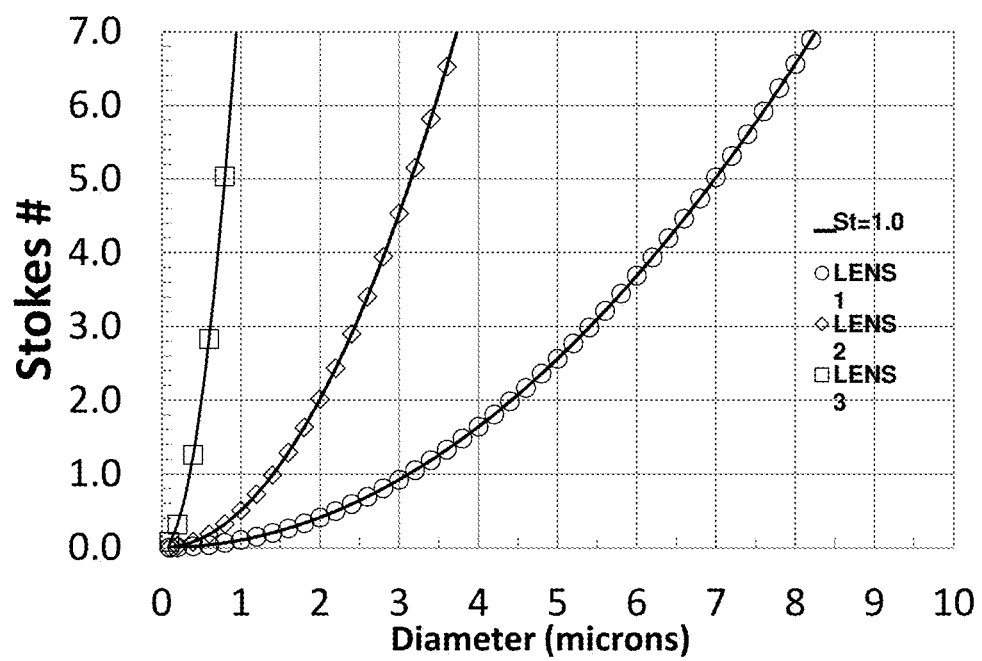
FIG. 12 is a graph showing Stokes number versus droplet diameter for a 3-lens assembly.

The graph of FIG. 12 is a plot that illustrates the importance of eliminating small droplets from the aerosol distribution and is a plot of Stokes number (St) versus the particle diameter for the parameters of embodiments of the invention. Furthermore, the strict need for a multi-lens focusing assembly is illustrated in FIG. 12. The plot shows the focusing ability of each lens with respect to droplet diameter. The smallest lens (lens 3), which is also the focusing nozzle has a diameter of 100 microns. At flow rates that are practical for electronic printing applications, focusing nozzles less than 100 microns in diameter are prone to clogging, so that 100 microns represents a lower limit of the orifice diameter for reliable printing.

The plot of FIG. 12 shows that an aerosol distribution with droplet diameters less than 0.3 microns and greater than 0.8 microns is poorly focused with a single-lens system consisting of Lens 3 (D=100 microns), since the Stokes number of small droplets will be much less than unity and the large droplets will have a Stokes number of much greater than one, leading to overspray and satellite droplet deposition. Indeed, a single-nozzle focusing system using a typical atomizable electronic ink will be prone to deposition of overspray and large satellite droplets. Furthermore, while the addition of solvent vapor to the sheath and aerosol gas flows will reduce overspray deposition, the presence of small droplets in the aerosol stream will remain problematic. Since the addition of solvent vapor to the gas flow will also prevent large droplet evaporation, deposition of satellite droplets can become an issue in an untuned single lens focusing assembly through which a vapor-laden solvent is propagated. The addition of solvent vapor to the aerosol and sheath flows can also lead to solvent condensation as the gas flows through parts of the printer that are at a lower temperature than the gas. However, in embodiments of the invention, a sheath gas is passed through a reservoir containing the ink solvent fluid, allowing for solvent evaporation into the gas as the gas flows above the surface of the fluid. The temperature of the vapor laden sheath gas is kept below the dew point of the solvent as the flow passes through the print module so that condensation is eliminated.

Considering a distribution with droplet diameters ranging from 0.5 to 4 microns, only a small portion of the smallest droplets will be focused by Lens 3. Lenses 1 and 2 will have almost no effect on small droplets since the Stokes number for diameters less than 1 micron will be less than 0.2. Droplet diameters in the range of 0.5 to 1.5 microns will therefore pass through the first two lenses of the assembly while undergoing little or no focusing.

It is noted that since commonly used aerosolization methods produce a distribution of aerosol diameters, matching the droplet distribution and the lens assembly is critical for optimum focusing and high-definition printing. Conventional aerosol printing systems use atomization methods that produce droplets with diameters ranging from 0.3 to 4 microns. Since droplet growth is not possible due to the low relative humidity and due to the short aerosol transit time, an aerosol distribution that undergoes significant evaporation will be shifted to small, difficult to focus droplet diameters. It has been determined that focusing of droplets with diameters below 0.5 micron requires a final lens diameter of 100 microns or less. However, aerosol focusing nozzles with diameters less than 150 microns are not practical for aerosol printing systems used for long-term printing or production applications due to small deposition rates and orifice clogging. It is well known in the art that the use of a vapor-laden aerosol or sheath gas to reduce or eliminate droplet evaporation. However, a droplet distribution that is not tuned to an aerodynamic lens assembly will be poorly focused, regardless of the addition of solvent vapor.

An examination of the plot of FIG. 12 in combination with equation 1 (EQ. 1) further provides an understanding of the difficulty of focusing sub-micron diameter droplets in ambient conditions. Considering the droplet fluid properties and the lens diameter as constants, the differential form of equation 1 is provided in equation 2, $$\Delta St = \left(\frac{\rho U}{9\mu D}\right) d \Delta d \quad (2)$$

Figure 13:
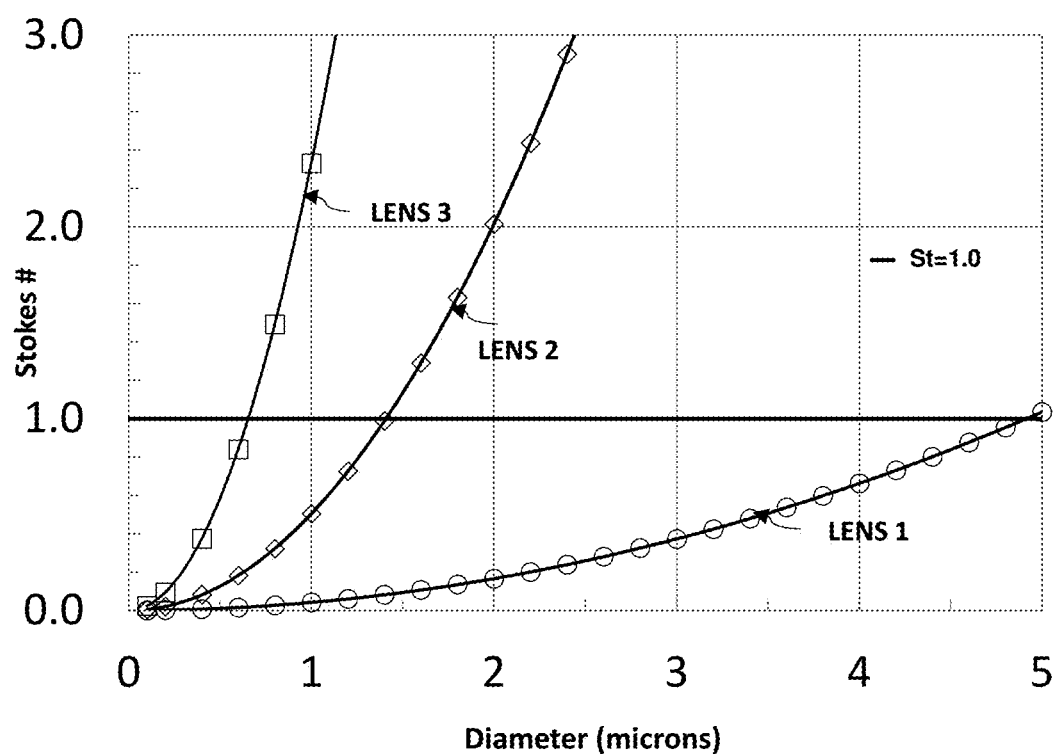
FIG. 13 is a graph that illustrates a modified lens assembly used for a droplet diameter distribution shifted to larger sizes.

The plot of Stokes number as a function of droplet diameter for Lens 3 (FIG. 1A) and Equation 2 show that the rate of change of St with respect to droplet diameter is significant for the case of a 100-micron lens and droplets in the range of 0.3 to 0.8 microns. While droplets in the range of 0.3 to 0.8 microns will be well-focused, droplets less than 0.3 microns will be deposited as overspray, and droplets larger than 0.8 microns will form satellites. The present invention overcomes the problem of focusing large and small droplets at either end of the diameter distribution by eliminating the production of sub-micron droplets while using larger sheathed aerodynamic lens diameters to focus large droplets in the distribution. FIG. 13 shows such a plot where flow through an exemplary lens assembly provides optimum focusing for a droplet diameter distribution of from 0.5 to 5 microns. Lens 3 provides focusing of droplet diameters in the range from 2.6 to 5 microns. Lens 2 focuses diameters ranging from 1.0 to 2.5 microns, while lens 1 focuses droplets from 0.5 to 1.0 microns. It is appreciated that lens details are routinely optimized for a given set of printing conditions. The addition of a sheath vapor or an aerosol and sheath vapor will maintain the match between the aerosol droplet diameter distribution and the lens assembly. Maintenance of the match between the diameter distribution and lens assembly ensures focusing at either end of the diameter distribution and enables high-definition aerosol-based printing.

Figure 14:
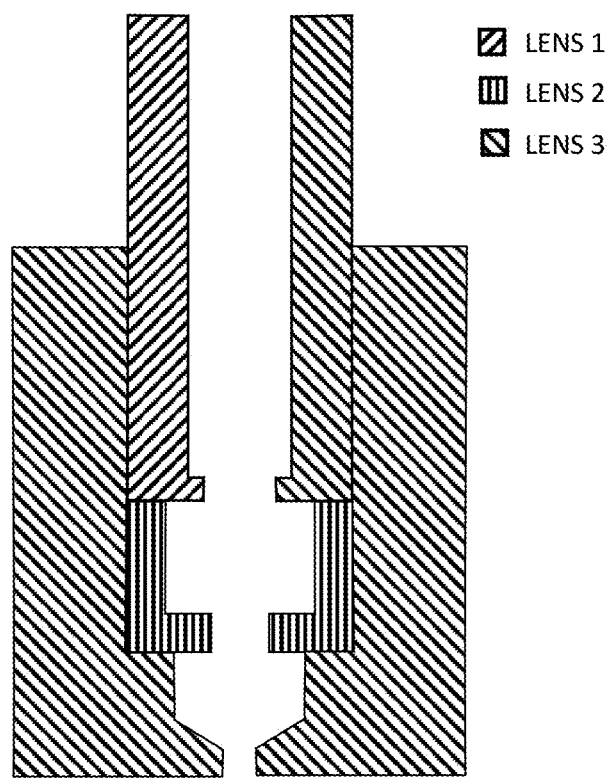
FIG. 14 shows a drawing of a three-component aerodynamic lens assembly.
Figure 15:
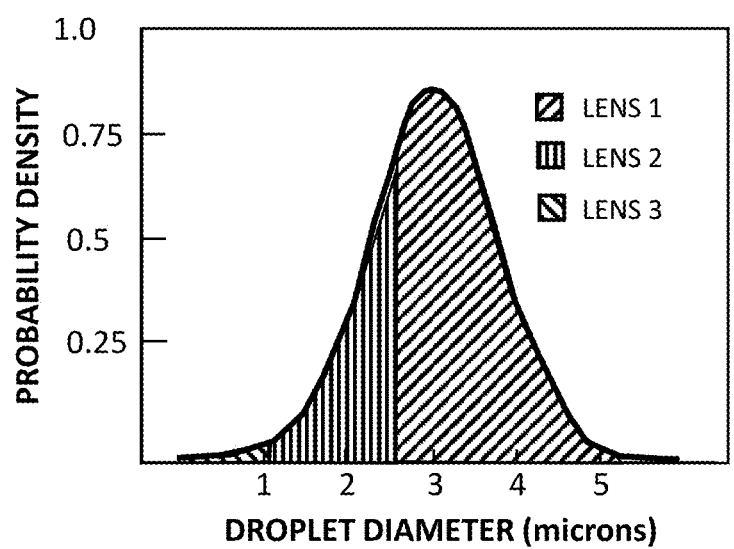
FIG. 15 gives a representation of the focusing ability of a multi-component lens assembly.

FIG. 14 shows a drawing of an exemplary three-component aerodynamic lens assembly. The lens orifice diameter decreases as the aerosol flows through the assembly. FIG. 15 gives a representation of the focusing ability of a multi-component lens assembly. In the specified three-lens assembly, the area under the distribution curve is completely covered by the lens assembly. Sheath gas vapor inclusion or sheath gas and aerosol gas vapor inclusion prevents the diameter distribution from shifting to smaller diameters, so that complete focusing of the distribution is maintained. A single-lens system using sheath gas and aerosol gas vapor, even if matched to the center of the distribution, would only maintain a match for the associated area under the distribution curve, and would not focus droplets at either end of the curve.

Embodiments of the present invention overcome clogging and poor focusing of sub-micron droplets and large micron-size droplets by (1) using atomization methods that produce a droplet distribution with diameters in the range of 1 to 6 microns, (2) using a cooled vapor-laden sheath or aerosol gas flow to maintain the aerosol diameter distribution without solvent condensation, and (3) using flow rates and aerodynamic lens diameters tuned to the larger diameter distribution to provide optimum hydrodynamic and aerodynamic focusing.

The invention embodiments provide for a method and apparatus for direct printing of high-density, high-definition features on a substrate in ambient conditions. Of particular interest is the provision of a process and apparatus for stable and repeatable deposition of liquids onto substrates for additive manufacturing applications, including but not limited to metallization of rigid and flexible substrates, deposition of inorganic and organic samples for sensor applications, and deposition of various inks for green energy applications such as solar cell metallization and fuel cell production. According to embodiments, the inventive apparatus is capable of printing 5-micron wide lines with 5-micron spacing, enabling high-density applications such as interconnect redistribution.

According to embodiments, a constant aerosol output is supplied to a surface to enable printing of high-definition high density patterns. The aerosol output rate to the surface is held constant by minimizing pulsing of the aerosol flow at the aerosol output port of the ink cartridge, by maintaining a constant gas flow rate to and from the cartridge, and by maintaining a constant aerosol density in the region where aerosol is extracted from the cartridge. According to embodiments, the present invention minimizes the horizontal distance the aerosol must travel to exit the ink cartridge. For the aerosol droplet diameter distribution produced by a common atomizer, aerosol settling occurs after five to ten millimeters of horizontal travel. Aerosol settling can lead to fluid accumulation within the ink cartridge, causing variations in the aerosol output rate. The present invention therefore limits the horizontal travel of the aerosol-laden gas to no more than five millimeters, according to embodiments.

Entrainment of ink at the ink cartridge gas input or aerosol output can lead to pulsing or variation in the aerosol output to the surface. Ink entrained at the output or input ports can form a film that partially or completely blocks the port. Entrainment of ink in the input and output ports of the ink cartridge leads to variability in the aerosol output rate as the ports are alternately blocked and cleared. Correspondingly, the internal pressure of the cartridge increases and decreases. Variation in the mass flux of aerosol delivered to a surface therefore results in variation of the printed trace line width, leading to bulging or necking of the trace that can adversely affect the electrical and mechanical properties of the deposited trace. Blockages result in a momentary decrease in the aerosol output followed by an increase in aerosol output rate as pressure builds and the blockage is cleared when the pressure rises above a critical value. According to the present invention, pulsing or variation in aerosol output is avoided by using a combination of baffles, or a baffle and a set of vertical ribs that isolate the gas input port and aerosol output port from the ink spout produced by the ultrasonic aerosolization process.

Another feature provided according to embodiments of the present invention is a constant aerosol gas flow rate in order to produce a constant aerosol output. The present invention uses mass flow controllers to maintain the aerosol gas flow rate to within 2 percent or less of a set aerosol gas flow value. Similarly, the aerosol gas output rate is held constant by achieving a saturated or near-saturated aerosol density within the ink cartridge volume. When a condition of saturated aerosol density is reached, small variations in the production of aerosol result in little or no change in the ink chamber aerosol density, allowing for a constant aerosol output.

High-output, low gas flow rate atomizers enable production of a dense, narrowly dispersed aerosol distribution that is highly stable and tuned to the optimum or near optimum size range of the focusing assembly. According to embodiments, a tunable or fixed-frequency atomizer, an interchangeable and adjustable single-stage or multi-stage aerodynamic lens system, and an annularly flowing sheath gas are used. The combination of a co-axial sheathed flow and the use of aerodynamic lenses forms a hybrid hydrodynamic/aerodynamic focusing apparatus that collimates and deposits a stream of particles with diameters in the range of 0.5 to 5 microns.

In hydrodynamic focusing, an inner fluid or aerosol-laden gas stream is surrounded by a co-propagating annular sheath fluid or gas. As the combined streams flow through an orifice or a series of orifices, the volume available for the inner flow is reduced by the volume occupied by the outer sheath flow. Hydrodynamic focusing occurs when the reduction in the inner flow volume results in a decrease in the diameter of the inner stream, with the decrease in the inner stream diameter being proportional to the ratio of the aerosol to sheath gas flow rates.

An aerodynamic lens is a flow configuration in which a particle-laden gas traveling through a cylindrical channel is passed through an orifice, with the gas undergoing one contraction upstream of the orifice and one subsequent and immediate expansion downstream of the orifice. A contraction of an aerosol stream is produced as the flow approaches and passes through the orifice. The gas then undergoes an expansion as the flow propagates downstream into a wider cross-sectional area. Flow through the orifice forces particles towards the flow axis, so that the aerosol stream is narrowed and collimated.

Yet another unique aspect of the invention is the ability to print high-density circuits in two or three dimensions. In particular, high-definition high-density 3D circuits can be printed wherein conductive layers are isolated by insolating layers, with interconnecting vias that transport power and signals between conductive layers.

The interchangeable ink cartridge of the print module can be used to print multi-layer multi-material circuits wherein vertical interconnects are formed between insulated conducting layers. According to embodiments, the inventive apparatus facilitates printing of multi-layer vertical circuits since a single tool, the flow cell, is used to print each layer. Conductive layers are connected by directly printing vias in the insulating layers and printing an interconnect in the via to connect two successive conductive layers.

Another unique aspect to the present invention is the elimination of the requirement for tool offset definition between printing of single or multi-layer multi-material circuits. In the multi-layer print process, the tool (the flow cell) remains fixed, and the printed material is varied using interchangeable ink cartridges. In such a method, high-accuracy printing can be performed since each layer is assigned the same reference point, and since the need to determine the vector distance between two or more print tools is eliminated.

According to embodiments, the substrate is attached to a platen mechanically or using a vacuum. The platen is connected to a multi-axis motion control system so that when combined with an aerosol shuttering process, the atomizer, flow cell, motion control, and platen assembly enable printing and material processing of discreet patterns and structures on the substrate. The platen is capable of being heated to 100° C. and in some inventive embodiments to 150° C. and in other embodiments to 170° C., thereby enabling real-time curing or sintering of deposited material.

According to embodiments, the apparatus includes multi-nozzle arrays. In a multi-nozzle configuration, an assembly including several exit nozzles with sheathed flows is fabricated, for example in a linear array, so that simultaneous deposition from each nozzle is enabled.

According to embodiments, the present invention can also be used to build three-dimensional structures using a layer-wise process, wherein simple and complex objects are printed directly from a computer-automated drawing (CAD) file. In the 3D printing process, laser-assisted deposition or a viscoelastic ink is used to deposit a liquid filament with a viscosity large enough to form a rigid or semi-rigid structure upon which subsequent layers are deposited. In the 3D printing technique, a digital model of an object is intersected with horizontal planes. The horizontal planes form cross sectional representations or slices of the object. Information in each slice is uploaded to a computerized motion control system, so that a solid object can be fabricated using an additive manufacturing process. The process can be used to fabricate three-dimensional objects from materials including, but not limited to metals, ceramics, and plastics.

The inventive apparatus also enables printing of multi-layer high-definition circuits or patterns. A high-definition high-density printed circuit or pattern is defined as an assembly of traces having line widths of 5 microns, with a spacing of 5 microns. The current invention uses interchangeable ink cartridges or a multi-material print head to print high-definition high-density circuits or patterns.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. An apparatus for printing discrete high-resolution high-density features on a surface using an aerosol stream, the apparatus comprising;
    an aerosol chamber adapted for a transport gas to enter through a port positioned in an upper and offset portion of the aerosol chamber relative to at least one internal baffle overlying a source of an ink and to entrain aerosol containing droplets of the ink in the aerosol chamber to form an aerosol-laden transport gas;
    a flow cell having a flow cell channel bounded by sheath gas ports in fluid communication with a source of a sheath gas, the sheath gas ports adapted to convey the sheath gas to the flow cell channel via sheath gas outlets connected to the sheath gas ports via sheath gas conduits bounding the flow cell channel and through which the aerosol-laden transport gas is passed, and the aerosol-laden transport gas is surrounded by sheath gas passed through the sheath gas conduits substantially parallel in flow direction to the flow cell channel; and
    an aerosol tube positioned within the flow cell channel at the sheath gas outlets;
    wherein the aerosol chamber is in direct communication with the flow cell via a slanted channel so that aerosol-laden transport gas is transported directly from the aerosol chamber to the aerosol tube through the slanted channel;
    wherein at least one aerodynamic lens is adapted to receive the aerosol-laden transport gas surrounded by sheath gas and print the aerosol droplets from the aerosol-laden transport gas onto the surface of a substrate.

2. The apparatus of claim 1 further comprising a temperature controlled platen.

3. The apparatus of claim 1 further comprising a solvent reservoir in fluid communication with the aerosol-laden transport gas.

4. The apparatus of claim 1 further comprising a plunger or valve for selectively isolating the flow cell channel from the aerosol-laden transport gas to create a shuttering mode.

5. The apparatus of claim 1 wherein aerosol droplets of the aerosol-laden transport gas have a mean diameter of 0.5 to 8 microns.

6. The apparatus of claim 1 further comprising an atomizer base.

7. The apparatus of claim 1 wherein the aerosol-laden transport gas and the sheath gas are combined in the flow cell.

8. The apparatus of claim 1 wherein said at least one aerodynamic lens is two or three lenses that vary in orifice diameter from one another.

9. The apparatus of claim 1 further comprising at least one internal baffle wherein the at least one internal baffle is within the aerosol chamber and configured to isolate the aerosol chamber from at least one aerodynamic lens, the shape of the at least one internal baffle selected from the group consisting of planar, arcuate, split cylindrical, angular, S-shaped, and Y-shaped.

10. The apparatus of claim 1 wherein the aerosol tube includes one or more of an internal restrictor that reduces an internal diameter of the aerosol tube at at least one point along a length of the aerosol tube, a flare extending from the aerosol tube into the aerosol chamber, or a combination thereof.

11. An apparatus for printing discrete high-resolution high-density features on a surface using an aerosol stream, the apparatus comprising;
    an aerosol chamber adapted for a transport gas to enter through a port and entrain aerosol containing droplets in the aerosol chamber to form an aerosol-laden transport gas;
    a flow cell having a flow cell channel bounded by sheath gas ports in fluid communication with a source of a sheath gas, the sheath gas ports adapted to convey the sheath gas to the flow cell channel via sheath gas outlets connected to the sheath gas ports via sheath gas conduits bounding the flow cell channel and through which the aerosol-laden transport gas is passed, and the aerosol-laden transport gas is surrounded by sheath gas passed through the sheath gas conduits substantially parallel in flow direction to the flow cell channel; and an aerosol tube positioned within the flow cell channel at the sheath gas outlets, the aerosol tube having a first end at a first end of the flow cell channel and a second end below the sheath gas outlets, and the aerosol tube having one or more of an internal restrictor that reduces an internal diameter of the aerosol tube at least one point along a length of the aerosol tube;

wherein the aerosol chamber is in direct communication with the flow cell via a slanted channel so that aerosol-laden transport gas is transported directly from the aerosol chamber to the aerosol tube through the slanted channel;

wherein at least one aerodynamic lens is adapted to receive the aerosol-laden transport gas surrounded by sheath gas and print the aerosol droplets from the aerosol-laden transport gas onto the surface of a substrate.

* * * * *